United States Patent

Millis, Jr. et al.

[15] 3,676,652

[45] July 11, 1972

[54] ELECTRONIC LINEAR MEASURING DEVICE

[72] Inventors: Hugh L. Millis, Jr., Anaheim; Eugene A. Hoskinson, Tustin, both of Calif.

[73] Assignee: Intertek Controls, Inc.

[22] Filed: Feb. 18, 1970

[21] Appl. No.: 12,256

[52] U.S. Cl. ...................235/151.32, 235/151.1, 318/594
[51] Int. Cl. ...................................................G06f 15/46
[58] Field of Search ...................235/151.1, 151.32, 151.11, 235/151.3; 318/569, 572-573, 592-594, 603, 609, 640; 356/247; 83/72; 73/490; 33/71, 142

[56] References Cited

UNITED STATES PATENTS

| | | |
|---|---|---|
| 3,537,102 | 10/1970 | Baratto .......................235/151.32 UX |
| 3,394,248 | 7/1968 | Ogden...............................318/594 X |
| 3,427,518 | 2/1969 | Cloup ...........................235/151.11 X |
| 3,493,827 | 2/1970 | Tinkler................................318/594 |
| 3,406,601 | 10/1968 | Clifford.........................235/151.32 X |
| 3,293,759 | 12/1966 | Moe et al............................318/592 X |
| 3,142,018 | 7/1964 | Eisengrein ..............................318/593 |
| 3,323,030 | 5/1967 | Inaba et al. ..............................318/593 |
| 3,440,410 | 4/1969 | Offereins ..........................318/594 X |
| 3,458,786 | 7/1969 | Thompson...............................318/594 |

Primary Examiner—Eugene G. Botz
Assistant Examiner—Jerry Smith
Attorney—Hugh L. Millis, Jr.

[57] ABSTRACT

The present invention relates to an electronic digital measuring system for measuring and displaying the length a member extends beyond a measuring point, and, more particularly, to an electronic digital measuring system which makes coarse and fine measurements by a pair of independent measuring units of the distance a member being measuring extends beyond a measurement point and additionally combines and displays the combined measurements.

11 Claims, 13 Drawing Figures

INVENTORS
HUGH L. MILLIS JR
EUGENE A. HOSKINSON
BY
Hugh L. Millis

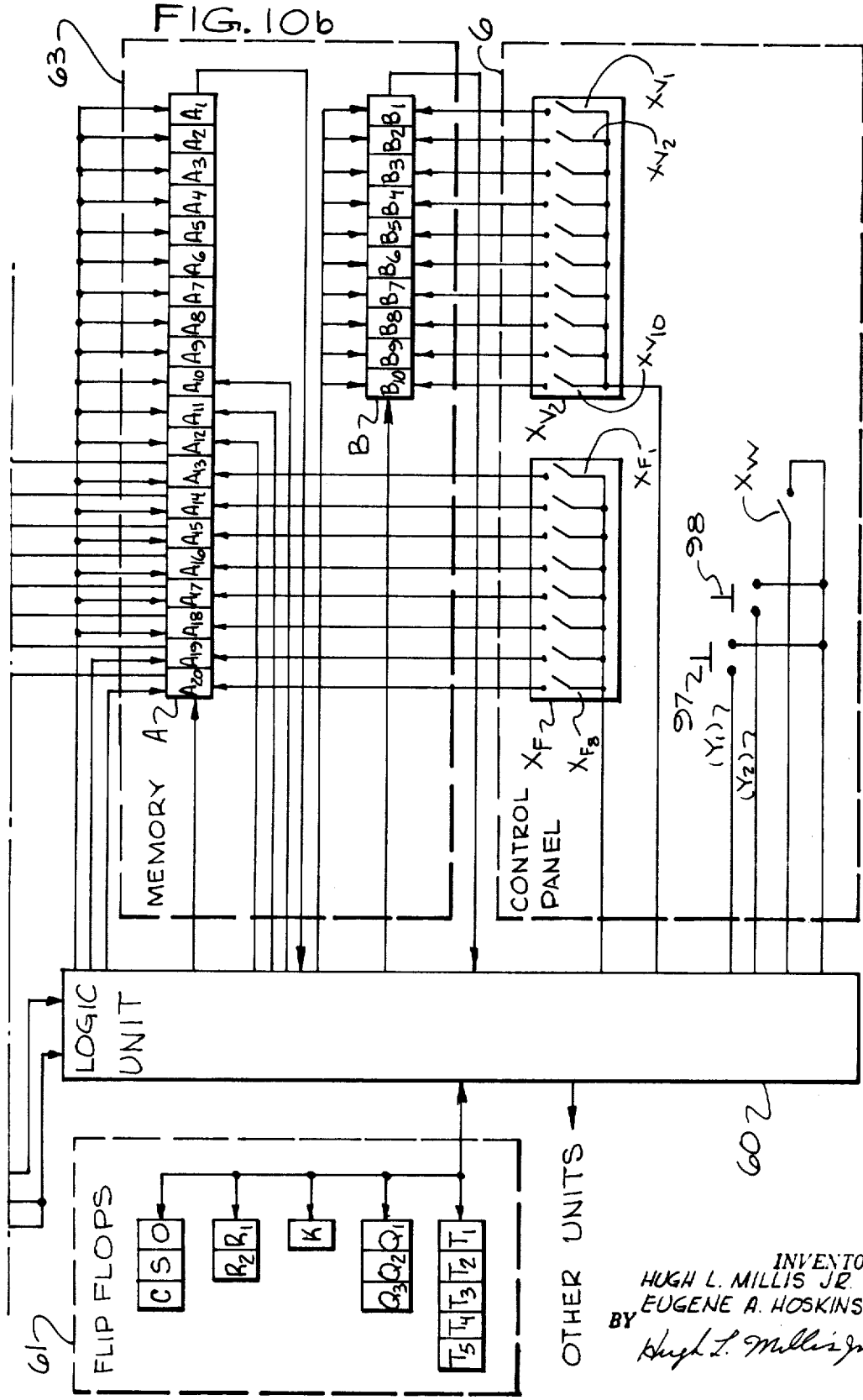

ELECTRONIC LINEAR MEASURING DEVICE

BACKGROUND OF THE INVENTION

One commonly performed linear measuring function occurs in the metal handling and fabrication industry, particularly those sections of the industry involved with the storage, sale, and use of steel material in the form of rods, beams, tubes, etc. Standard lengths of these items are stocked in local warehouses who, in turn, sell individual pieces of varying, specified lengths to fabricators and other users. A measuring and cutting operation is therefore required for meeting most individual orders, and this function represents a major service performed by the warehouses in their selling and distribution operations.

The conventional technique now employed for measuring steel lengths is by use of a metal tape, a hooked end of which is pulled against one end of the steel piece being measured and the tape unrolled by the operator to the specified length at which point a chalk mark is made on the steel. A cut is thereafter taken at the chalk mark. This technique, besides taking an undue length of time, is subject to operator mistakes due to misreading of the tape, particularly in typical warehouse environments. In addition, and of equal importance, the typical cut made on the broad chalk mark is often exaggerated in length so as not to cheat the purchaser. This inaccuracy not only results in wasted material but, in some cases, results in the user having to take another cut to obtain a precise, desired length.

One existing semi-automatic measuring system is integrally built into an expensive hydraulically actuated cutting table. In this system a hydraulically driven stop member, under operator control, is attached to the end of a spring loaded tape measure which is unrolled past a cutting point. The stop is driven by the operator to the desired length, as measured on the moving tape, and then locked in place. The workpiece is then rammed against the stop, clamped, and cut.

The operation is time consuming since the stop is driven at a constant, relatively slow rate. Again, a tape must be read with the measurement again being subject to human errors. Also, a problem of calibration exists since the stop can and does frequently get knocked out of alignment with the tape's end due to the continuous ramming action it is subjected to. Finally, this measuring system is an integral part of a considerably more expensive system and jointly shares a number of system elements. Hence, it represents an inflexible measuring approach in that it cannot be adapted or used with any other types of cutting tables.

SUMMARY OF THE INVENTION

The linear measuring system, according to the present invention, not only elegantly overcomes the disadvantages of the measuring system just described in terms of mechanical simplicity, accuracy, flexibility, readability, and speed of measurement, but additionally offers substantial advantages over presently employed manual measuring techniques.

The linear measuring system of the present invention is shown in conjunction with a conventional power saw and associated roller table of the type found in steel warehouses and fabricators for performing individual cuts of varying specified lengths on stocked material. The general approach used in its mechanization employs a unique combination of two separate, but complementary, measuring subsystems which operate together to provide the overall measuring function.

The first or fiducial subsystem comprises a series of fiducial units, spaced longitudinally along the roller table. Each unit includes a collimated light source directed into a separated photocell and amplifier. The units are disposed relative to a normal range of workpiece cross-sectional shapes, dimensions, and placement on the roller table, such that each light beam is intersected or broken by the workpiece whenever it extends along the table to at least its lateral position along the table. A lateral adjustment capability is provided for each unit and an alignment of all units relative to each other is made such that the same predetermined, spaced distance, one foot by way of example, separates the series of consecutive fiducial units. Although all of the fiducial units are spaced one foot apart from each other, the group as a whole can have any spacing, including an integral number of feet down to inches and fractions of an inch, from the roller table's cutting plane or surface. The inches and fractions of an inch of, or lateral offset distance, from an exact foot, are placed in a first set of toggle switches and the resulting value thereafter employed by a logic unit in the measurement process.

The first function performed on the information generated by the fiducial subsystem is determining the coarse length, in feet, of the workpiece's length. This length corresponds to the particular pair of fiducial units between which the workpiece's end lies and is logically determined by the particular, consecutive pair of fiducial units whose beams are blocked and open, respectively. This logic information is converted, employing the lateral offset information in the first set of toggle switches, and information from the other measurement subsystem described next, into an output visual display representing the workpiece's length to the nearest foot.

The second or quantizing subsystem of the present linear measuring system, provides an interpolation, to a high resolution, of the workpiece's length between adjacent fiducial units. This function is mechanically provided by a rubber coated roller which is pivotally moved by a solenoid, energized under specified logic conditions, into contacting engagement with the workpiece. Lateral movement of the workpiece is transformed into rotational movement of the roller and a digitizer, coupled to the roller's shaft, produces incremental, bi-directional output signal pulses related to the rotation. These pulses are passed through a digital integrator, used for scaling purposes, in the logic unit into a counter whose count, at any time, represents the workpiece's displacement in inches and fractions of an inch from the nearest footage reading, as determined by the fiducial system. The contents of this counter are decoded and visually displayed as inches and fractions of an inch adjacent the footage display provided by the fiducial subsystem. The integrator scaling value is externally stored in a second set of front panel toggle switches and relates the effective roller diameter, slippage, digitizer characteristics in terms of pulses per angular movement, to the scale desired, for example, one sixty-fourth inch per pulse, for the workpiece's longitudinal incremental movements.

The two measurement subsystems are not independent, but instead have a sharply defined logical and operational relationship which is necessary to obtain an overall measurement repeatability and accuracy. In particular, the fiducial system produces two useful measurements, one being a continuous indication of coarse length, to within one spaced pair of fiducial units, and the other, time dependent measurement, which occurs at the instant any light beam is broken following a blocked interval, or is blocked following an open status. This latter measurement is important in that an exact, unambiguous length of the workpiece is available at the instant of make/break occurrence, and corresponds to the involved fiducial units distance from the measurement point or cutting surface. This latter distance is equal to the number of feet the particular fiducial unit is from the measuring point plus the fiducial subsystem's lateral offset, in inches and fractions, found in the first set of toggle switches. Thus, at each make or break occurrence, the offset reading is ordered transferred from the toggle switches into the counter driven by the incremental system with the result that the counter contents and associated display accurately reflect the exact length of the workpiece.

Following this operation, the quantizing subsystem takes over, and all incremental signals representing longitudinal travel of the workpiece, are summed into the counter with the result that the inches and fractions of an inch section of the display remains updated. The footage portion of the display, formed from the fiducial units, is combined with the state of a carry flip-flop which holds any overflow from the quantizer driven inches register. Such a carry occurs whenever the summed reading passes 12 inches in a positive direction of workpiece travel and 0 inch in a negative direction. The carry flip-flop enters into the fiducial unit decoding circuitry driving the footage reading portion of the visual display such that the next higher footage reading is obtained than is indicated by the fiducial units themselves, whenever the carry flip-flop is "on."

The first set of toggle switches offers considerable flexibility in that the initial position of the set of fiducial units relative to the cutting surface may be arbitrarily determined based on mechanical expedience and still compensated for. Also, all subsequent calibrations, as may be required upon changes of the cutting mechanism, its cutting blade or surface, or any other mechanical changes are readily handled by changing the settings of these switches. In the same way, the second set of toggle switches, holding the digital integrator's scaling constant, lends considerable flexibility to the system not only for initial calibration of the slippage factor, roller diameter, the quantizer's pulses/rotation ratio, etc., but can later be modified to compensate for any changes in these factors, such as caused by wear, for example, insertion of new rollers of different diameters, etc. The ability to compensate for these various factors enables the quantizer subsystem to be adjusted so that it measures accurately with high repeatability.

It is, therefore, the principal object of the present invention to provide an electronic device for measuring and indicating the distance a longitudinal member extends past an initial measuring point. Another object of the present invention is to provide an electronic linear measuring device for measuring the distance a longitudinal member extends beyond a measuring point by making separate low and high resolution measurements and combining them into a single overall measurement of the distance.

A further object of the present invention is to provide a linear measuring device for measuring the distance a longitudinal member extends past a measurement point in which the device produces a first or coarse measurement based on the length the member extends along a series of fixed, spaced fiducial indicators, and a second or fine measurement based on the length the end of the member extends beyond the coarse measurement made by the fiducial indicators.

Still another object of the present invention is to provide a measuring device which produces a coarse measurement based on the distance the end of a longitudinal member lies between two adjacent discrete indicator devices out of a plurality of spaced discrete indicator devices, and a second fine measurement which interpolates the distance the end of the member lies between said adjacent indicator devices.

A still further object of the present invention is to provide a device which produces a first or coarse measurement of the distance the end of a longitudinal member lies between two adjacent discrete position sensing devices out of a series of spaced discrete position sensing devices, a second or fine measurement which interpolates the distance the end lies between the adjacent indicator devices, combines the coarse and fine measurements to form a single, accurate measurement of the length of the end of the movable member, and displays the single combined measurement.

Another object of the present invention is to provide a measuring system for measuring and indicating the distance a longitudinal member extends beyond an initial point in which a first measurement is derived which determines that the distance lies between an adjacent pair of a series of spaced position sensing members, and a second measurement is derived which determines the precise distance the longitudinal member lies between the adjacent pair of position sensing members, and in which the first and second measurements are combined and displayed as a single composite measurement representing the longitudinal members length.

A further object of the present invention is to provide a linear measuring system for measuring and indicating the distance a longitudinal member extends beyond an initial point in which a first measurement is derived representing the distance to lie only between two adjacent sensing members out of a series of spaced sensing members and a second measurement is derived representing the precise distance the longitudinal member lies between the single adjacent pair of sensing members, represented by the first measurement, the second measurement being derived by quantizing the incremental movement of the longitudinal member as it is moved from or toward the initial point, the first and second measurements being combined to form a single measurement which is visually displayed.

Another object of the present invention is to provide a device for continuously measuring the distance a member extends past a measuring point as it moves along a series of discrete sensors in which the member's position at any instant along the discrete sensors in measured to lie between an adjacent pair of sensors and is represented by a first low resolution measurement, and in which the member's position between the adjacent pair of sensors is continuously provided by incrementally measuring and summing the member's motion to obtain a second high resolution measurement, and in which the first and second measurements are combined to provide a final composite measurement representing the instantaneous distance the member extends past the measuring point.

Another object of the present invention is to provide a device for producing a first measurement of the length a longitudinal member extends beyond an initial point to at least some integral number of measurement units and producing a second measurement representing the fractional portion of a measurement unit that the end of the member extends beyond said integral number of measurement units whereby the combination of the first and second measurements represents the overall distance the longitudinal member extends from said fixed point.

Other objects, features and attendant advantages of the present invention will become more apparent to those skilled in the art as the following disclosure is set forth including a detailed description of a preferred embodiment of the invention as illustrated in the accompanying sheets of drawings, in which:

BRIEF DESCRIPTION OF THE DRAWINGS

FIGS. 10a and 10b are block diagram representations of the principal elements constituting the logic and display sections;

DESCRIPTION OF THE PREFERRED EMBODIMENTS

Figure 1:
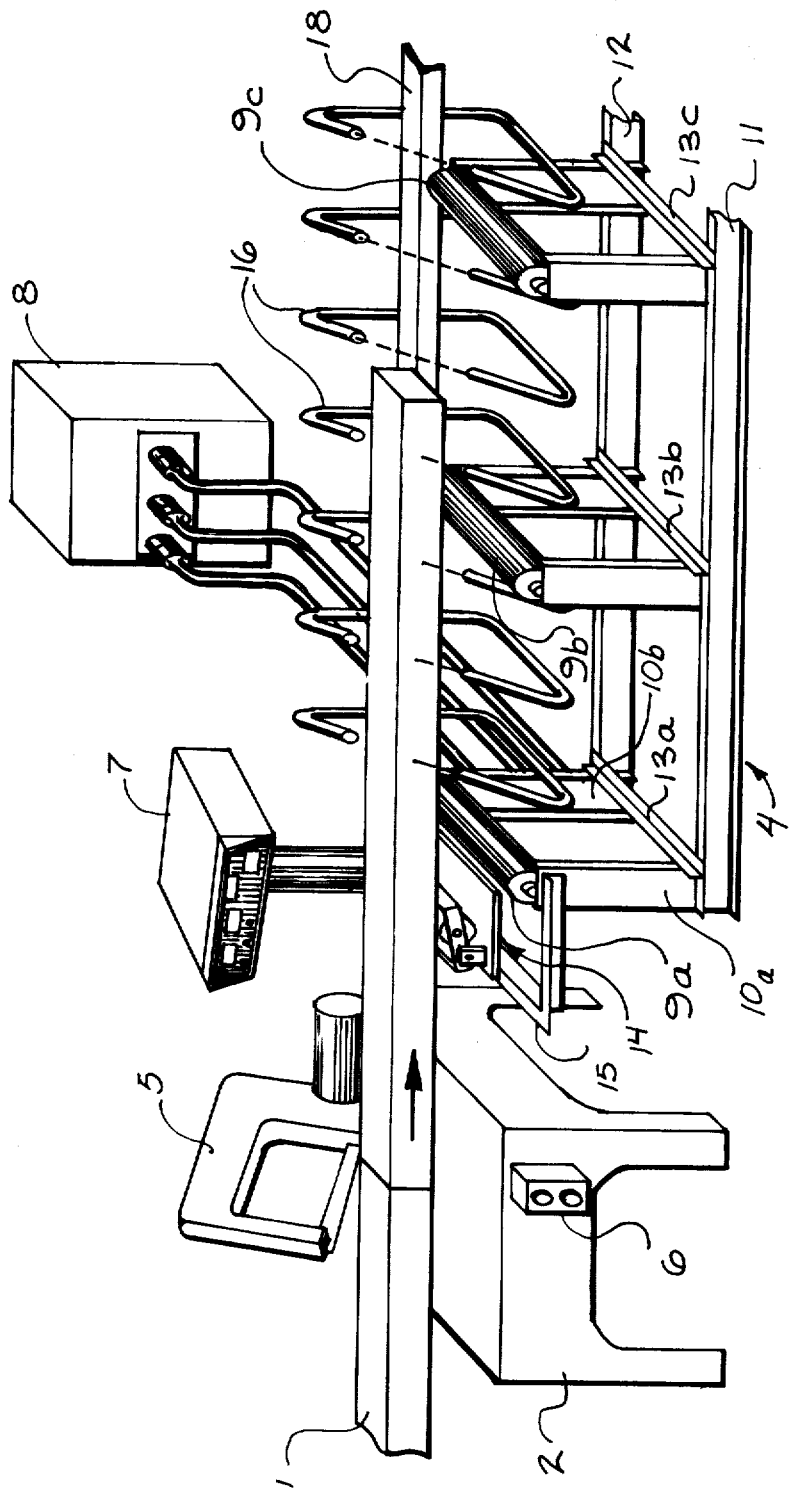
FIG. 1 is a perspective view showing the general external organization of the measuring system of the present invention applied to a typical cutting station and roller assembly.

Referring now to the drawings, wherein identical elements are given the same numerical designations throughout the several figures, there is shown in FIG. 1 a perspective view of a typical embodiment of the measuring system according to the present invention as it is adapted to a roller assembly and cutting station for measuring and cutting longitudinal pieces of metal. A longitudinal member or workpiece 1 is supported by a cutting table 2 and a pair of roller assemblies on either side, only the portion on the right and generally indicated at 4 being specifically shown. Table 2 holds a cutting mechanism such as a power hack saw 5 and a control panel 6, indicated generally, for enabling an operator to control the on/off operation of the saw.

A display and control station 7, associated with the measuring operation, is shown in proximity to the cutting station. It contains appropriate switches, control buttons, etc., to enable the operator to order and control the measuring operation and also serves to display via a visual readout the workpiece's measured length to the operator. An electronic unit 8, displaced from the cutting and roller assembly, is illustrated and contains all of the measuring system's logic, power supplies, test equipment, etc. It is connected to the display and control panel, various sensors located along the roller table, and other sections of the system through appropriate cabling. The organization of the front panel of display and control station 8 is defined later in terms of specific display digits, indicator lights, and control pushbuttons, as the logic section of the present measuring system is established.

The roller assembly includes a series of workpiece supporting rollers, three being shown at 9a, 9b, and 9c, each of which is individually supported at its ends through appropriate bearings to vertical support members, such as 10a and 10b, for roller 9a. The bottom ends of the set of forward vertical support members are attached to a forward longitudinal member, such as a beam 11, while the bottoms of the rear support members are attached to another beam 12. The lower ends of the resulting forward and rear frames are connected by lateral members such as L beams 13a, 13b, etc., at the points of vertical support member attachment.

Two measuring subsystems, termed quantizing and fiducial, are employed for providing the overall measurement function. The mechanical portion of the quantizing system is indicated generally at 14, mounted on a U-shaped frame 15 which, in turn, is attached to the upper ends of roller support members 10a and 10b. Additional mechanical details of this quantizing subsystem are illustrated and explained in connection with FIGS. 2 and 3. The other or fiducial measuring system comprises a series of identical, equally spaced, fiducial unit housings, two being indicated generally at 16, which are connected to a fiducial unit support angle 18, which, in turn, is connected to the upper portion of the rear set of vertical supporting members such as 10b, etc. Additional details of the fiducial unit housing are given in FIGS. 4 and 5 and explained in connection therewith.

The individual fiducial units are bent such that their ends are in alignment with and face each other. A focused light beam is emitted from one end and is directed toward a photocell, with an amplifier, arranged in the other end. THe dimensions and mounting of the units are such that the adjacent presence of a workpiece intersects the light beam. Hence, a coarse reading, within a foot, of the distance the end of the workpiece extends beyond the cutting surface, can be obtained by decoding the fiducial units. This is done by recognizing that the particular pair of units between which the workpiece end lies, will be logically identified by being respectively intersected and not intersected by the workpiece.

While the fiducial subsystem gives a measurement to a foot of resolution and accuracy, the quantizing subsystem serves to interpolate between the fiducial footage readings to give a reading in inches and fractions of an inch of the workpiece length. Essentially, the quantizing subsystem includes a roller which is raised during a measuring operation to make contact with the workpiece. It is then rotated by the workpiece's lateral movement, produced by the operator as he positions it toward the desired length. The roller shaft is directly coupled to a quantizer or digitizer whose output pulses are summed by a digital counter included in the logic. Now, by resetting the counter at each instant a fiducial unit change is detected, i.e., a normally open beam being broken, or a broken beam being opened, at which time an exact footage reading is available, the resulting counter value continuously represents the distance the workpiece end extends beyond the last changed fiducial unit as the workpiece movement continues. By scaling this incremental distance in the counter in inches and fractions thereof, the display of its contents serves to represent the final portion of the overall length measurement.

Figure 2:
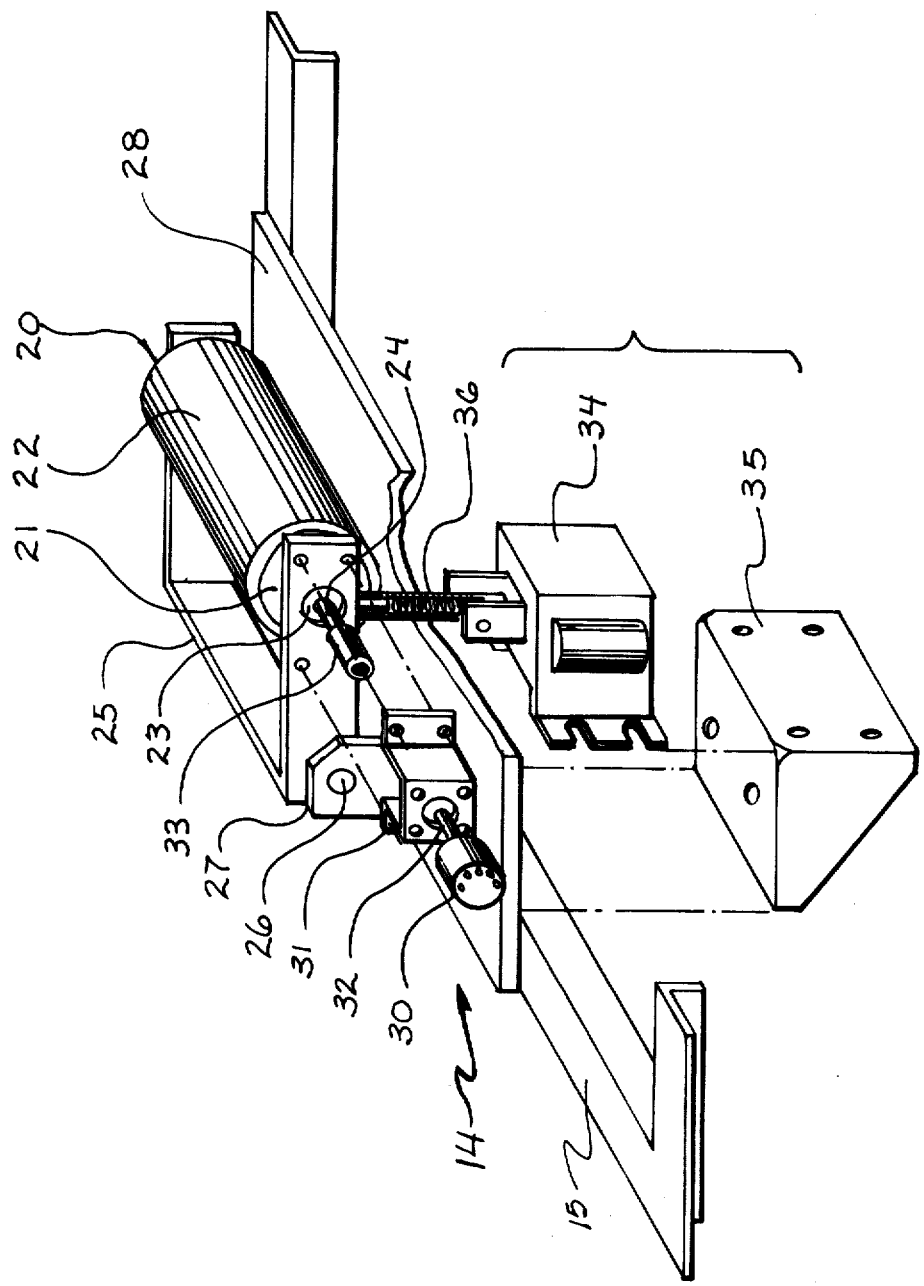
FIG. 2 is a perspective view, with parts broken away, of the mechanical portion of the quantizer subsystem.

The quantizing unit assembly 14 is shown in more detail in FIG. 2. A roller assembly 20 is shown which includes a cylindrical center or inner portion 21 which may be formed in a number of detailed configurations by a number of techniques as will be recognized by those skilled in the art. Center 21 is coated with an outer rubber surface 22. Roller assembly 20 is mounted on a shaft 24 which, in turn, is rotationally attached via bearings, one being shown at 23, to the opposite sides of a U-shaped pivoting bracket 25. Bracket 25, in turn, is pivotally attached, again by bearings, as at 26, to a pair of laterally disposed support members only one being shown at 27. These support members are rigidly attached to a mounting plate 28, which, in turn, is attached to the U-shaped assembly support 15, shown and noted earlier in the FIG. 1 system perspective drawing.

A device for electronically sensing and quantizing the rotational movement of roller assembly 20, such as a digitizer 30, whose detailed characteristics are given later in the discussion of the logic section of the present measuring system, has its body section or case mounted via a mounting bracket 31 to the movable support member 25. The shaft 32 of digitizer 30 is coupled by way of a coupling sleeve 33 to roller shaft 24.

A solenoid 34, providing pivotal movement to the roller assembly, is secured by mounting bracket 35, shown displaced from the assembly, to mounting plate 28. Its plunger assembly, indicated at 36, is disposed to travel in an upward or vertical direction upon energizing of the solenoid's coil, and engage the lower edge of one arm of bracket 25.

Figure 3:
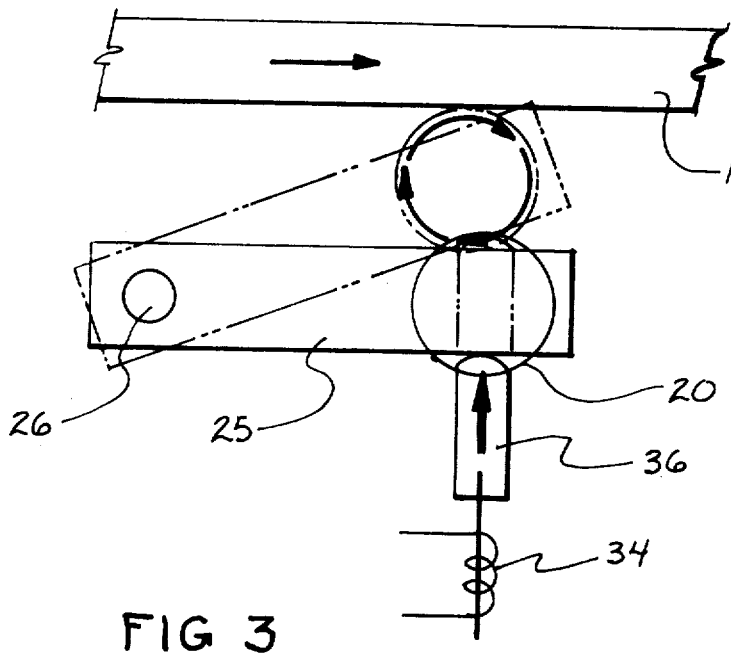
FIG. 3 is a schematic view showing the operation of the roller and solenoid assembly.

The mechanical operation of the quantizer subsystem is best understood by reference to FIG. 3 which shows schematically, in a side view, the solenoid, roller and workpiece relationship. In the normal, or de-energized state of the solenoid, the weight of the roller assembly, resting against the top of the solenoid plunger, is pivoted or rotated in the clockwise direction away from, and out of contact with, the workpiece, as is indicated by the solid line view in the figure. Upon electrical energization of the solenoid, its plunger is actuated upward, pushing and hence rotating bracket 25 about its pivot point 26 until the rubber surface of roller 20 is firmly engaged with the bottom of workpiece 1. This contact will be continuously maintained so long as the solenoid is energized, and any lateral movement of workpiece will be reflected in a rotation of roller 20 and its subsequent quantization by digitizer 30. Since the solenoid exerts a continuous upward thrust against the roller assembly, the roller will be maintained in contact with the workpiece during its lateral movement even though the lower surface of the workpiece may be distorted, having a long bend for example, as may be encountered in long steel beams.

The energization of the solenoid is ordered by the appearance of certain logic terms which are applied through properly conditioned amplifiers or relays to drive the solenoid coil. The factors involved in making up these logic terms will be described later in the logic section of description of the present measuring system.

Figure 4:
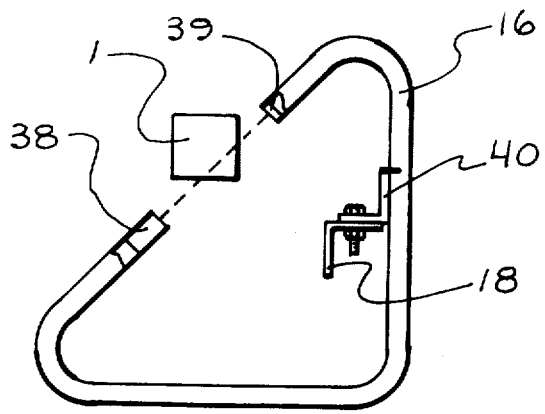
FIG. 4 is a side view of a fiducial unit.
Figure 5:
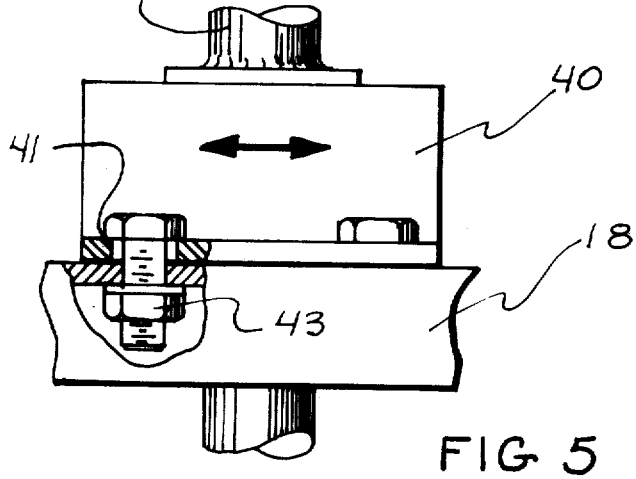
FIG. 5 is a front view, with parts broken away, showing the mounting of a fiducial unit to a support angle.

Additional details of a typical fiducial unit housing, including its mounting and lateral adjustment, are shown in FIGS. 4 and 5. From FIG. 4, a housing may, for example, be formed from a piece of tubular stock, having a first 90° bend at approximately its center. This is followed by a pair of 135° bends at points disposed from its two ends such that the ends co-axially face each other. A light source and associated mounting 38 are inserted in one end. Included in this assembly, now shown in exhaustive detail, is a light bulb, a socket for the bulb, an aperture or slot, and a general mounting package, including electrical leads, for carrying electrical energy to the bulb. Also required is a lens system for collimating the emitted light to lie along the indicated dotted path. Although many optical techniques are available for providing this function, a preferred embodiment employs a particular type of light bulb having the top or end portion of its glass envelope shaped to give an inherent focusing or collimating effect to the internally generated light. A bulb type 253X manufactured by the General Electric Company, represents one suitable type employing this combination and performing the stated function.

A photocell-amplifier combination, indicated generally at 39, is packaged in a suitable subassembly form, and inserted in the opposite end of the fiducial unit housing and then secured. A circular aperture is included at the outer end of this packaged unit to provide an additional collimating action on the received light beam.

The fiducial unit housing is attached, as by welding, along its approximately mid-section to one face of an angle mounting bracket 40. Bracket 40, referring to FIG. 5, has a pair of longitudinally disposed slots along its outer face, one being shown in cut away fashion at 41. Suitable nut, bolt, and washer arrangements, as at 43, are inserted through the slots 41 and matching holes in the fiducial unit support angle 18 to thereby attach the fiducial unit housing to the common support angle. The longitudinal holes and associated nut and bolt arrangements permit a lateral adjustment of the fiducial unit, and hence light beam, to be manually performed. This adjustment is required in order that the consecutive fiducial unit beams can be positioned to a precise, fixed offset distance from each other, which is, in the present system embodiment, one foot.

Figure 6:
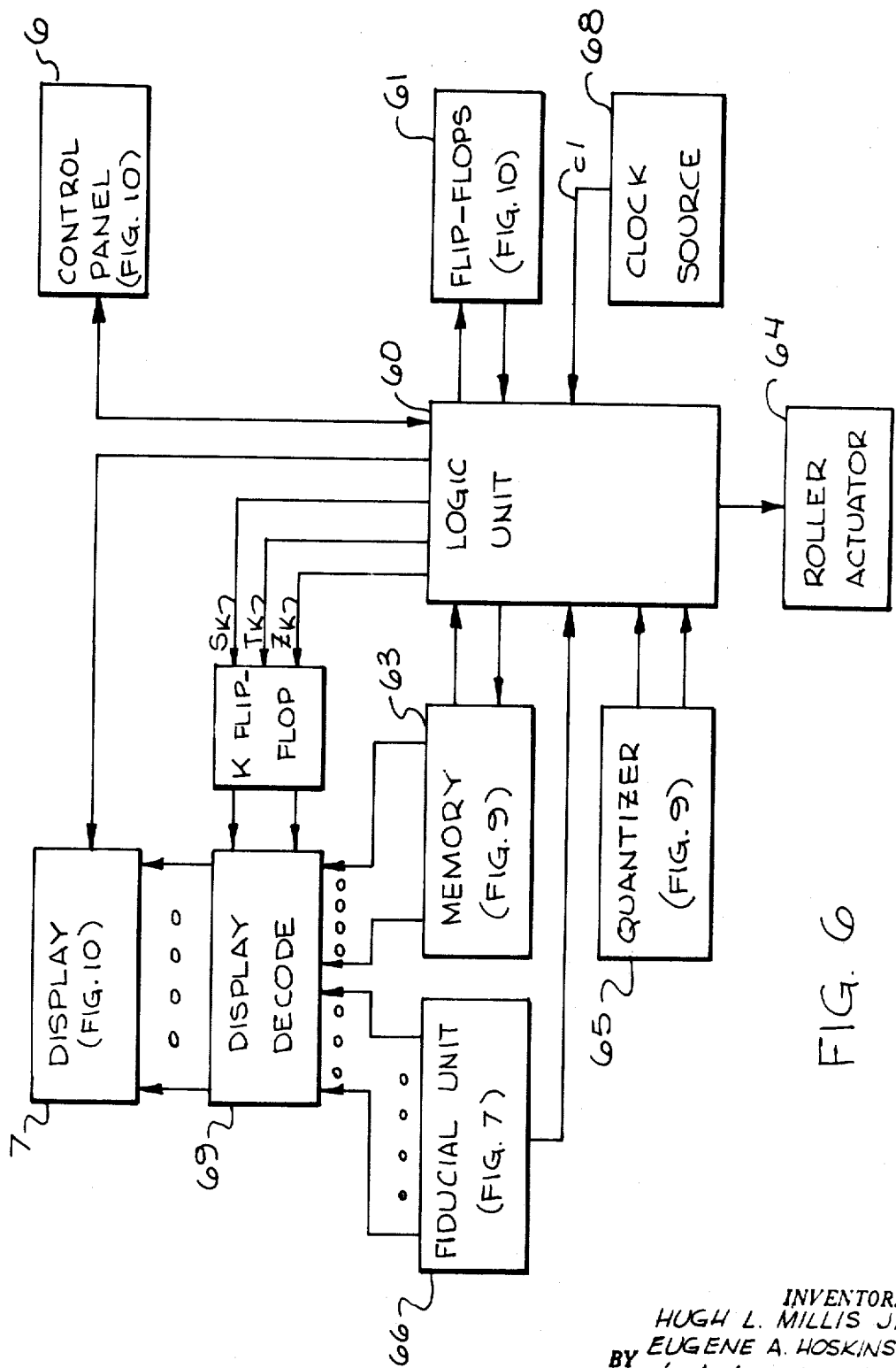
FIG. 6 is a block diagram showing the electronic and logical organization of the present invention.

The major electronic subsystems of the linear measuring system according to the present invention are shown in block schematic form in FIG. 6. A logic unit 60 represents the key subsystem and is composed of a relatively complex logical network which is later defined in detail in the form of a series of logical equations. Unit 60 provides triggering signals for a set of flip-flops, indicated generally by a flip-flop unit 61, and controls the operation of a memory unit shown in more detail in FIG. 9, the roller actuator unit 64 shown earlier in FIGS. 2 and 3, a fiducial carry flip-flop K, display unit 7, and control unit 6, both from FIG. 1. Unit 60 receives logic signals from the quantizer unit 65, the fiducial unit 66, the panel unit 6, and a clock signal $c1$ from a clock signal source 68. Certain outputs are taken from memory unit 63 and fiducial unit 66 to a display decode unit 69 whose outputs, in turn, drive the display unit 7.

Figure 7:
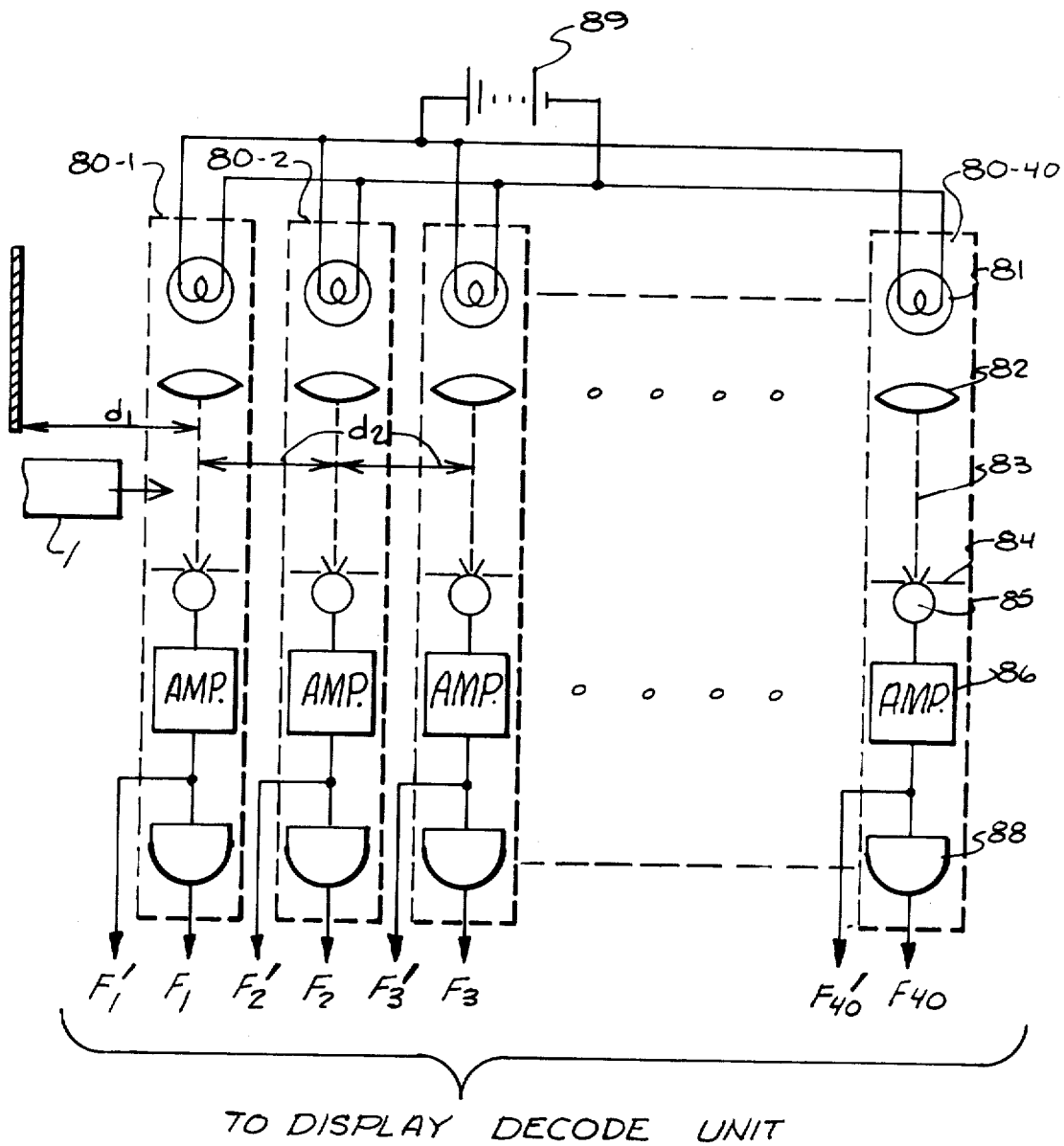
FIG. 7 is a partly schematic and partly block diagram representation of the fiducial subsystem elements.

The fiducial measuring subsystem is illustrated in schematic form in FIG. 7. It includes a series of identical fiducial sensing units, indicated at 80–1, 80–2, on through 80–40, the –1, –2, etc., corresponding to the particular footage measurement made by its associated unit. Each unit, taking 80–40 as an example, includes a light source 81, whose beam is partially collimated by a lens system, indicated at 82, along a path 83 transverse to the travel of the workpiece being measured. The beam is directed through a slit or aperture 84, which provides a final collimating function, and falls on a light sensitive device or detector, such as a photo transistor or photo diode 85. The output signal of the light detector is applied to an amplifier 86 whose direct output signal is logically designated $F_{40}'$. Signal $F_{40}'$ is applied to an inverter logic circuit 88 whose output signal is logically designated $F_{40}$. Finally, all light sources are energized by a source of potential, such as a battery 89.

In operation, the primed logic signal, $F_1'$ for example, in absence of interruption of its particular unit's light beam by the workpiece, will correspond to a logic "1," and the unprimed output, $F_1$, will be a logical "0." In each unit, an interrupted beam produces an $F'$ output signal of a logic "0," and an $F$ signal of "1." This operation is by definition only, and in practice is determined by the number of amplification stages in the amplifier, assuming each stage inverts the level of its input signal.

In the subsequent logic, the effective linear position of each fiducial unit from the cutting surface is determined by the length of workpiece required for its edge to either intersect (make) or open (break) the light hitting the photo-sensitive element to the extent that an output logic change occurs. That is, the $F$ and $F'$ signals go from 0,1 to 1,0, respectively, for an open-to-interrupt or break-to-make condition, and from 1,0 to 0,1, respectively, for an interrupt-to-open or make-to-break condition. It will be appreciated that the difference in measured length between make and break indications, i.e., hysteresis effects, and, in addition, the change of effective measurement position with time, due to component aging, dirt, temperature changes, etc., can be minimized by providing sufficient amplification, regulated electrical power, careful mechanical and optical design, etc.

In the subsequent logic, the fiducial subsystem is decoded to determine the workpiece placement to lie within the space between adjacent fiducial units Thus, the workpiece end lying between units 80–4 and 80–5 will be presented by the logic proposition $F_4F_5'$ being true. In the same way, similar logic expressions, $F_1F_2'$, $F_2F_3'$, etc., are mechanized to establish workpiece end placement between all pairs of adjacent fiducial units.

There are two linear measurement distances involved in the present system. One is the initial distance, $d_1$, as indicated in FIG. 7, from the measurement edge, or saw face (from FIG. 1) to the activating point across the beam of the first unit 80–1. The other or $d_2$ value is the constant spacing employed between fiducial units. The $d_1$ distance will be greater than $d_2$ and, in fact, may be some multiple of $d_1$ plus an offset. That is, the first fiducial unit may be positioned at 5 feet and 6 inches, for example, from the cutting or measuring surface. The $d_1$ distance in this case would be 5 $d_2$ plus 6 inches, were $d_2$ is assumed to be a foot in the present system. In general, however, $d_2$ need only be a unitary measurement quantity, such as a foot or a meter, for simplicity of decoding and display. It is, however, not expressly limited to such since fractional or multiple measurement units could be employed for the spacing constant.

Figure 8:
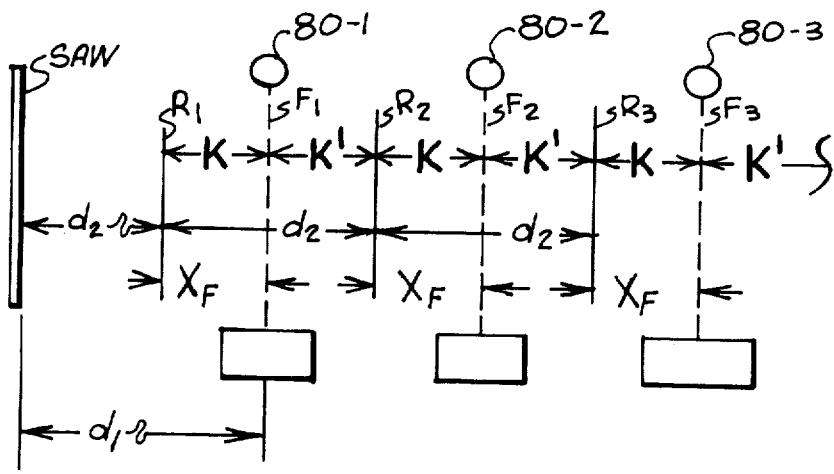
FIG. 8 illustrates the relationship between measured and displayed footage units.

A more general showing of this initial offset and interunit spacing is shown in FIG. 8. Assume that the fiducial units are spaced one foot apart and that the first unit 80–1 is located at a point more than 1 foot, but less than 2 feet, from the measurement point. The linear distances to be displayed (feet) are indicated at $R_1$, $R_2$, etc., with adjacent R's being separated by the $d_2$ distance, with $R_1$ being at a $d_2$ distance from the measurement point. The $d_1$ measurement, representing the spacing of the first fiducial unit 80–1 from the measurement point, is $d_2$ plus an offset value, $X_f$. The $X_f$ value is placed into a set of $X_f$ toggle switches, as described in detail later, and represents the common offset distance between the set of fiducial units $F_1$, $F_2$, etc., on one hand, and the set of displayed distances, $R_1$, $R_2$, etc., on the other. This offset calibration capability is provided so that no highly accurate, predetermined initial placement of the set of fiducial units relative to the measurement point is required. That is, the initial mounting of the frame holding the light sensing units can be based on matters of mechanical expedience, rather than the dictates of accuracy. Any resulting offset is merely measured and placed into the noted set of lateral calibration switches $X_f$.

A secondary result of this offset capability is that the entire linear measuring system can be later calibrated at any time and any lateral distance modifications, due to structural changes, insertion of a new cutting tool, damage to, with attendant movement of, the supporting frame, etc., compensated for.

The overall measuring technique employs two separate subsystems, as noted earlier, the fiducial and the quantizing. The quantizing system operates essentially to interpolate, to a specified accuracy and resolution, between adjacent fiducial readings, of the workpiece length which has passed the cutting edge as it moves along the roller table. Hence, the fiducial system, by definition and logical operation, provides accurate position fiducial measurement points at each light beam, while the quantizer system provides measurement information between the fiducial points. This interpolation operation is performed by quantizing the incremental motion of the workpiece and integrating (counting) the individual quantized increments. The total count accumulated at any instant represents the distance of the workpiece beyond the last activated fiducial unit. Each change of the fiducial system status, that is, each make or break occurrence produces a reset operation in which the previous accumulated interpolation value is arbitrarily reset to a value based on $X_f$, the lateral offset distance, as explained shortly.

Figure 9:
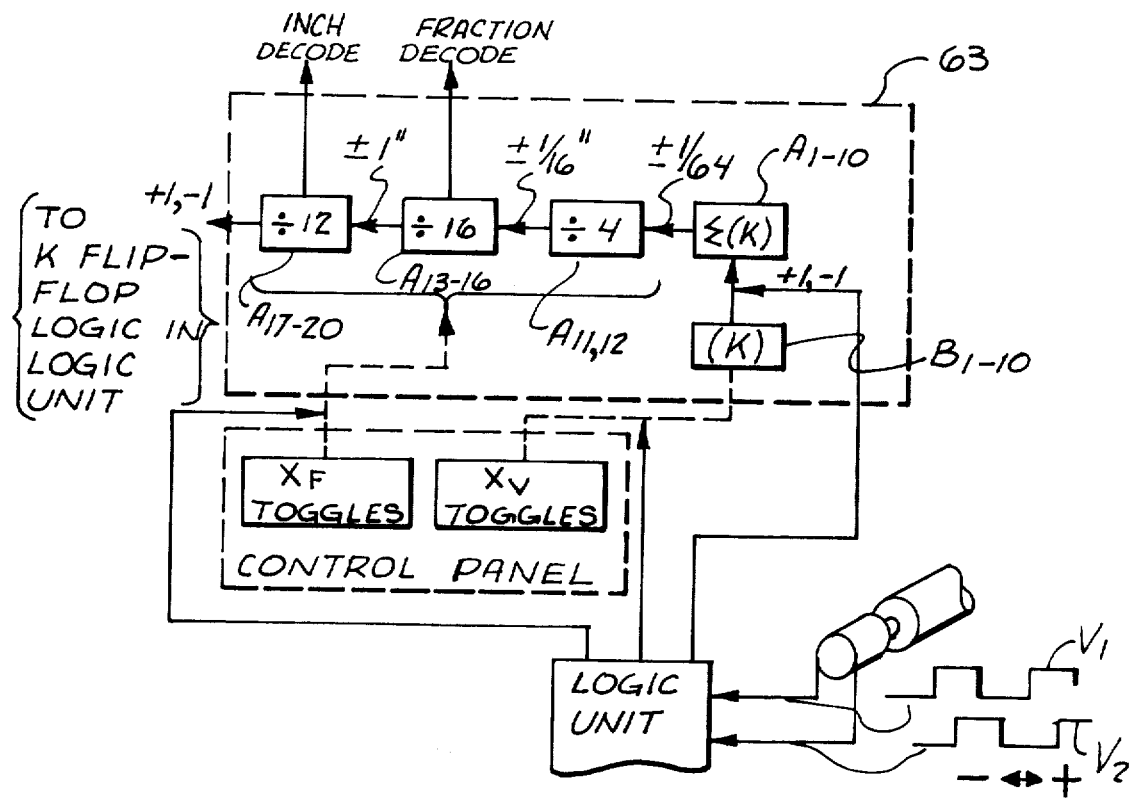
FIG. 9 is a block diagram representation of a portion of the quantizing subsystem.

FIG. 9 illustrates the general configuration and operation of the quantizer subsystem. Two serial memory devices, designated A and B, are employed, both being mechanized in the form of serial memory devices. In particular, the A register includes 20 flip-flops, designated $A_1$ through $A_{20}$, while the B register contains 10 flip-flops designated $B_1$ through $B_{10}$. The B register and the adjacent portion of the A register operate with an $X_r$ set of toggle switches, as a scaling integrator to relate the rotational movement of the roller to the linear distance traveled by the workpiece.

Typically, a digital integrator includes Y and R numbers, accepts $dx$ and $dy$ inputs, and produces a $dz$ output. Each of the $dy$, $dx$, and $dz$ quantities appear in the form of 1, 0 and −1 increments. The $dy$ input is integrated (counted) by the $y$ register to form a $y$ number. The $dx$ +1 and −1 inputs order additive and subtractive transfers, respectively, of the $y$ number into the R number with the 1, 0, and −1 overflows accompanying each transfer forming the $dz$ output. The $y$-number is in fractional binary form and is hence less than 1 in value.

In the present scaling integrator, no $dy$ input is involved, the $y$-number being picked off of the quantizer scaling toggle switches $X_r$, inserted into the $B_{1-10}$ flip-flops and then added or subtracted from the corresponding $A_{1-10}$ flip-flops under control of the 1, −1, and 0 digitizer output values, employed as the integrator's $dx$ input. The value placed into $X_r$ is determined in a manner described shortly, to be such that each $dz$ overflow represents one sixty-fourth of an inch of linear travel of the workpiece.

The remaining A register flip-flops, $A_{11-20}$, are operated as a counter to accumulate these integrator overflows for determining the fine distance between fiducial units. In particular, the $A_{11,12}$ flip-flops provided a countdown of four with the result that their 1/64-inch input value increments appear as 1/16-inch output increments. The next four flip-flops, $A_{13-16}$ count these 1/16-inch input increments down to 1-inch output increments which, in turn, are counted down by a sale-of-12 counter, $A_{17-20}$. The value residing in $A_{13-16}$ at any time is the quantizer subsystem measurement to a one-sixteenth of an inch while the $A_{17-20}$ count represents the number of inches in the quantizer measurement. Both of these sets of flip-flops are decoded and displayed.

Now, from FIG. 8 again, the instant a fiducial unit make/break operation occurs, the footage measurement corresponds to the particular fiducial unit involved, and the inches and fractions measurement to $X_f$. Hence, each fiducial make/break occurrence orders the $X_f$ value, in the $X_f$ toggle switches, transferred into the $A_{13-20}$ flip-flops with the result that they hold the true inches/fractional measurement at that time. Then the summation operation on the quantizer output pulses begins again, but based on this initially inserted value.

Another factor involved in the operating relationship between the fiducial and quantizing subsystems is the effect of overflow, either positively or negatively, of the $A_{11-20}$ flip-flops during the quantizing operation. For example, the summed value may, for a positive or left to right movement viewed from FIG. 1, build up to, say, 11 15/16 inches. Then, additional inputs cause an overflow to 00 and 00/00 inches which corresponds to the next higher footage reading. This is handled by placing this overflow value in a K flip-flop, serving as a fiducial carry, so to speak, whose value is decoded with the various F logic signals to order the next higher foot value displayed. The use of $K'$ and K terms is shown later in the detailed logic. Upon the next make/break fiducial reset operation taking place due to a continued positive direction of movement, continuing the example, K will be zeroed since the new fiducial unit status and associated logic will, by itself, give the correct footage reading.

For a negative or right-to-left movement of the workpiece, assume that a reset operation has just taken place following a break operation. The K flip-flop must be set to maintain the proper footage reading. The, the value in $A_{13-20}$ will be counted down until 00 00/00 inch is reached following which a negative overflow occurs with a reading of 11 15/16 inches being obtained. Simultaneously with this register overflow, K is zeroed since the controlling fiducial unit gives, at that position, the correct footage reading.

The value employed for $X_r$ will be determined by the diameter of the roller, the gearing ratio between the roller and quantizer shafts (assuming a gearing unit is employed instead of the direct coupling shown), the number of output 1 or −1 pulses produced by the quantizer per shaft rotation and, finally, by a rather subtle relationship existing between the quantizing and fiducial measuring subsystems.

This latter relationship is based, assuming a constant, predetermined spacing of fiducial units, on the permissible range of integrator output $dz$ values ($X_r \Delta Q$, where $\Delta Q$ is +1 or −1 from the quantizer logic) which will give a correct readout sequence between fiducial ordered reset operations. For example, assuming the lateral offset $X_f$ value to be zero and the integrator output $dz$ values being scaled to too small a value, the reading between fiducial units will pass 00 00/00 (K being set in the process) and will build up to some value greater than zero before a fiducial reset operation occurs at which time the 00 00/00 is reinserted. Hence the sequence will pass zero, attain some reading and then jump back to $X_f$ or zero. On the other hand, too large a $dz$ value will cause the inches/fractional reading to be too small at the fiducial reset operation with the result that one or more of the upper values in the measurement sequence will be skipped over. For example, a fiducial reset might occur at a reading of 11⅞ inches and 11 15/16 inches being skipped.

Without setting forth a comprehensive error analysis or the detailed reasoning leading to the assumptions made, assume that the fiducial units are adjusted laterally as a set so that they lie as close as possible to the nearest one-sixteenth inch. This value, in turn, corresponds to the value of the least significant $X_f$ toggle switch, whose value goes into the $A_{12}$ flip-flop. Assume now, that a reset operation has just occurred, for a positive direction of rotation, for $X_f$=0, and that $A_{10,11}$ have been arbitrarily set by logic to 00, respectively, as in the first line of Table I on the following page.

A permissible minimum sized $dz$ will produce a count of 0000 0000 11 (following overflow with a resulting K) at the instant of reset. This corresponds to 771 $dz$ units. A maximum sized $dz$, on the other hand, will produce a count up to exactly 11 15/16 (1011 1111 00) at reset, or a total of 764 increments. Hence, for positive directions of travel and $A_{10,11}$ reset to 0 0, $\Sigma X_r \Delta Q$ can range from 764 to 771 units and still give a proper read out sequence. An error of ± 1/16 inch is inherent in these limits at maximum ranges, i.e., just before $X_f$ is reset, assuming precise fiducial unit placement.

The lower part of the table corresponds to negative or right to left (from FIG. 1) workpiece motion, where, by definition, flip-flops $A_{10,11}$ are triggered to 11, respectively, by the reset operation. The minimum valued permissible $dz$ value produces a final value of 0000 0000 00 at reset while a maximum valued permissible increment produces a read out of one-sixteenth inch or 0000 0001 11 at reset. The range of $\Sigma X_r \Delta$tive direction or between 764 and 771 units, each unit centering $A_{11}$ at a one sixty-fourth inch scale.

Although Table I and the explanation thereof is based on an initial assumption of $X_f$ equal to 0, it will be apparent that the same principles hold for all values of $X_f$.

TABLE 1

| Motion | Condition | State K | A20 | 19 | 18 | 17 | A16 | 15 | 14 | 13 | A12 | 11 | ΣXvΔQ |
|---|---|---|---|---|---|---|---|---|---|---|---|---|---|
| (+) | Min. dz. value | K' | 0 | 0 | 0 | 0 | 0 | 0 | 0 | 0 | 0 | 0 | |
| | | | 0 | 0 | 0 | 0 | 0 | 0 | 0 | 0 | 0 | 0 | |
| | | | . | . | . | . | . | . | . | . | . | . | |
| | | K' | 1 | 0 | 1 | 1 | 1 | 1 | 1 | 1 | 1 | 1 | |
| | | K | 0 | 0 | 0 | 0 | 0 | 0 | 0 | 0 | 0 | 0 | |
| | | | . | . | . | . | . | . | . | . | . | . | |
| | | AT RESET→ | 0 | 0 | 0 | 0 | 0 | 0 | 0 | 0 | 1 | 1 | 771 |
| | Max. dz. value | K' | 0 | 0 | 0 | 0 | 0 | 0 | 0 | 0 | 0 | 0 | |
| | | | . | . | . | . | . | . | . | . | . | . | |
| | | AT RESET→ | 1 | 0 | 1 | 1 | 1 | 1 | 1 | 1 | 1 | 1 | 764 |
| (−) | Min. dz. value | K' | 0 | 0 | 0 | 0 | 0 | 0 | 0 | 0 | 1 | 1 | |
| | | | . | . | . | . | . | . | . | . | . | . | |
| | | K' | 0 | 0 | 0 | 0 | 0 | 0 | 0 | 0 | 0 | 0 | |
| | | K | 1 | 0 | 1 | 1 | 1 | 1 | 1 | 1 | 1 | 1 | |
| | | | . | . | . | . | . | . | . | . | . | . | |
| | | AT RESET→ | 0 | 0 | 0 | 0 | 0 | 0 | 0 | 0 | 0 | 0 | 771 |
| | Max. dz. value | K' | 0 | 0 | 0 | 0 | 0 | 0 | 0 | 0 | 1 | 1 | |
| | | | . | . | . | . | . | . | . | . | . | . | |
| | | AT RESET→ | 0 | 0 | 0 | 0 | 0 | 0 | 0 | 1 | 1 | 1 | 764 |

In considering the various parameters which determine the $X_r$ value, it must first be noted that a digital integrator provides a fractional or scaling down from a maximum of just less than 1 to zero. Hence, the total number of output pulses produced by the quantizer per foot of linear travel must be at least as great as 767, the maximum permissible count. Any greater quantity can be scaled down to appropriately sized units. For example, if the roller circumference is exactly 1½ feet, and the quantizer, coupled directly to the roller shaft, produces 3,000 pulses per revolution, $X_r$ would be calculated as follows:

$$764 \leq \frac{(X_v)(3000)}{1.5} \leq 771$$

$$382 \leq X_v \leq 385.5 \text{ (decimal)}$$

$X_r$ would be set somewhere between these two values in order to account for minute differences in fiducial unit separation. In particular, if the two limits were averaged, or 383.75 the resulting fractional binary number for $X_f$ is 0.0110001001 which would be set into the corresponding set of $X_f$ toggles. A switch $X_w$ is provided which, when on, inhibits the fiducial system ordered $A_{11-20}$ reset operation and thereby permits the quantizing operation to continue over any desired number of feet. Thus, in a calibration operation, the value of $X_r$ can be rapidly determined by trial and error by running out a distance of exactly 10 feet, say, and observing then how much the $A_{11-20}$ reading differs from 00 00/00, dividing this remainder by 10, subtracting it from or adding it to the existing $X_r$ value, and repeating the operation.

It will be appreciated that the use of the scaling integrator provides a number of system advantages. In the first place, no predetermined precise roller diameter need be specified and maintained. Instead, not only can an approximate diameter be initially tolerated and calibrated for, but subsequent wear, slippage, surface compression by the contacting member, etc., can be accommodated by initial and later calibrations. In addition, no logic changes are required to accommodate various numbers of quantizing pulses per revolution, with the result that different quantizers may be interchangeably used in the system.

Figure 10A:
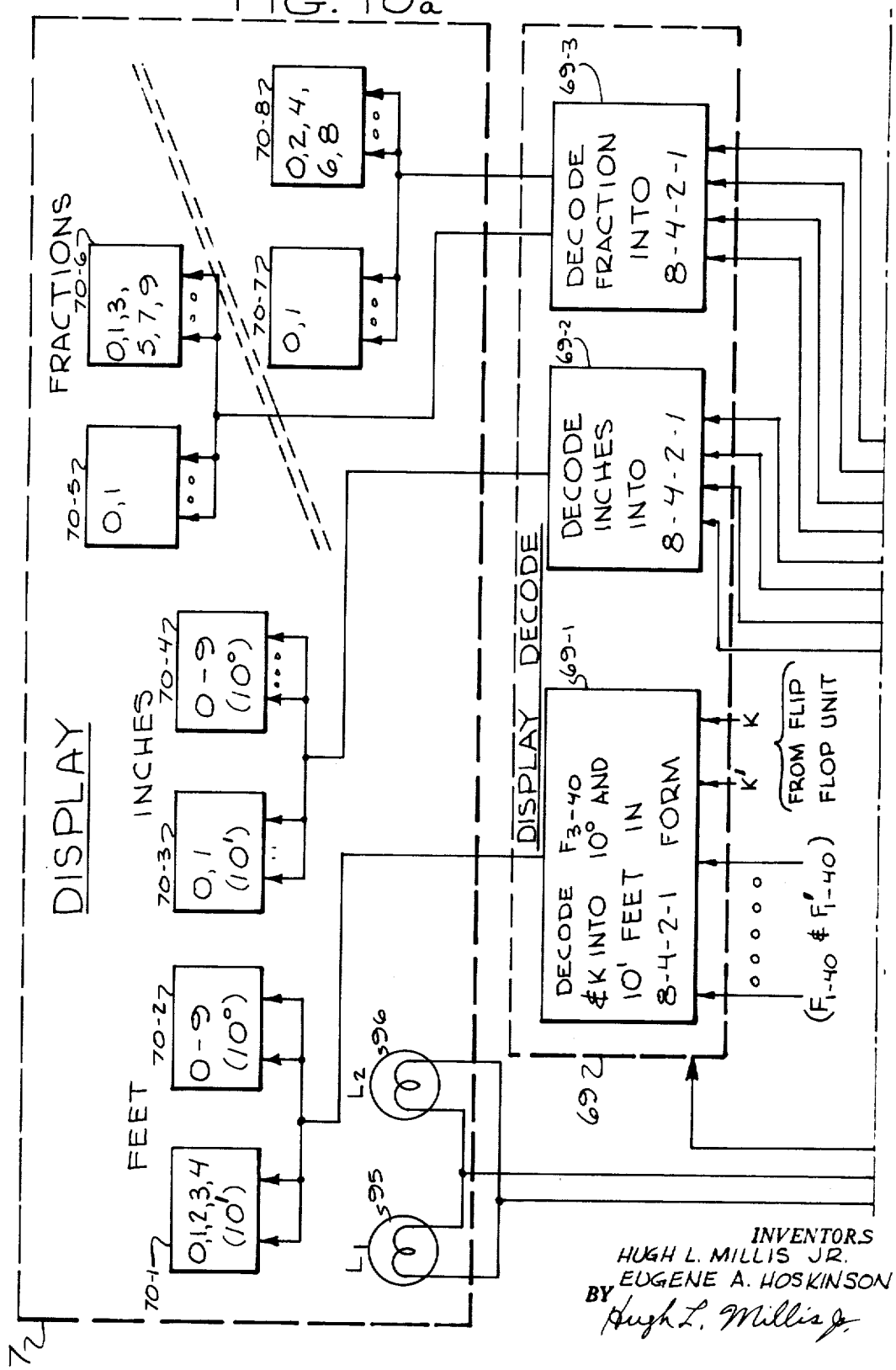

FIG. 10 shows additional details of the display, decode, memory, flip-flop, and control units. In particular, the measured footage indication is provided by display units 70–1 and 70–2, holding the tens and units foot digits, respectively, in decimal form. These units, as well as the remaining ones, may be formed of Nixie (trademark) display tubes, produced by the Burroughs Corporation along with associated drivers and individual decoders. The units take four logic signals in the 8–4–a'–1 BCD code as inputs and produce corresponding decimal digits as an output visual display. Since a maximum measurement capability of 40 feet has been specified for the present system, by way of example, the tens digit unit 70–1 will decode and display only the 0,1,2,3 and 4 digits while the units digit unit 70–2 will decode and display all 0 through 9 decimal digits.

The tens and units place digits of the measurement, in inches, is handled by units 70–3 and 70–4, respectively. Unit 70–3 will display 0 and 1 only, while 70–4 will selectively display all of the decimal digits. The fractions of an inch measurement display is in the form XX/XX where the two numerator digits are displayed by units 70–5 and 70–6 and the denominator by 70–7 and 70–8. Unit 70–5 produces a "1" value for 11/16, 13/16 and 15/16 readings only, and "0" for all remaining readings. Unit 70–6 will take odd values only, including "0," since all even values are, in the fractional inch number system, factored with the denominator to a lower, odd value. Unit 70–7 produces a "1" for all sixteenth of an inch readings while 70–8 produces, in addition to "6" for all sixteenth values, 0, 2, 4 and 8 corresponding to 0, 1/2, X/4 the and x/8 the values, respectively.

Finally, a pair of display lights $L_1$ and $L_2$ are shown at 95 and 96, respectively, which, when on, correspond to "ready for loading" and "cut." Their detailed meaning will become clear later after their respective logic drive terms have been derived. The display decode unit 69 includes three separate decoding sections, based primarily on the source of their respective driving signals. First decode unit 69–1 receives all F and F' terms from the fiducial subsystem and K flip-flop state and produces two sets of output decoded signals, each in the 8–4–a'–1 BCD system, for driving display units 70–1 and 70–2. Decode unit 69–2 takes the $A_{17-20}$ flip-flop signals and decodes them into two sets of 8–4–2–1 signals for inch display units 70–3 and 70–4. Decode unit 69–3 performs the same function for the four fractional inch display units 70–5 through 70–8 from the states of the $A_{13-16}$ flip-flops.

Flip-flop unit 61 includes all flip-flops except the memory ones, of the present system. Their respective names and functions are briefly described next.

The 0 flip-flop is employed to determine a change of fiducial subsystem status, i.e., a make/break occurrence. This is done by logically dividing the various $F_i'$, $F'_{i+1}$ terms, into odd and even groups, with 0 being triggered at predetermined times, to correspond logically to the odd-even indication. A change of status can then be logically recognized whenever the state of 0 does not match the odd-even proposition.

The S flip-flop holds the sign of the quantizer value, + or −, while C holds the carry of the B to A register addition or subtraction following each quantizer input. $R_1$, $R_2$ hold the last set of quantizer $V_1$ and $V_2$ output signals and are used to determine quantizer motion. The function of K has been previously described. $Q_1$, $Q_2$ and $Q_3$ form a set of programming flip-flops whose states and program changes are shown in the next FIG. 11. Finally, the $T_1$ through $T_5$ flip-flops serve as a counter to count the A and B register digits as they serially recirculate for the quantizer ordered add or subtract operation.

Conventional DTL or TTL IC flip-flops may be employed in the present system logic. A logic value of "1" may, for example, be represented by a +5 volt output level while ground would represent the logic value of "0." The system clock signal is assumed to be a square wave of alternate "0" and "1" logical values. It operates as a flip-flop trigger when it goes from its "1" to its "0" level. Hence, the clock will be "0" during the first half of each cycle and "1" during the last half while its prime or complement, $c1'$, also used later, will be consecutively "1" and "0" during the same two respective clock cycle halves.

The flip-flops are assumed to have set and zero (reset) input terminals, designated $S_x$ and $Z_x$, respectively, where x represents the particular flip-flop involved. A flip-flop is set or zeroed upon a "1" signal appearing on its respective set or zero terminal simultaneously when its trigger signal goes from "1" to "0". Although the system clock $c1$ is applied to the trigger terminals of some of the flip-flops, logic propositions are formed for others and are later designated by $T_x$ equations. Finally, each flip-flop is assumed to include asynchronous set and zero terminals designated $A_{Sx}$ and $A_{Zx}$, respectively. Each terminal, when at a logic "0," forces its associated flip-flop to its corresponding state, regardless of the simultaneous $T_x$, $S_x$, and $Z_x$ values.

In FIG. 10, the signal lines shown going from logic unit 60 to the tops of the A and B memory flip-flops carry asynchronous zero input signals while the bottom connections carry asynchronous set signals. The asynchronous set signals to the $B_{1-10}$ flip-flops, and the $A_{13-20}$ flip-flops are applied through the $X_r$ and $X_F$ toggle switch sets, respectively, in turn energized from logic unit 10. The asynchronous set signals to the $A_{11}$, $A_{12}$ flip-flops are taken directly from logic unit 60.

The $Y_1$ and $Y_2$ pushbuttons, designated 97 and 98 on control panel 6, are depressed by the operator for ordering a measuring operation and following completion of the measurement, prior to the cutting operation, respectively. The $X_{1r}$ switch is closed to disable the A memory reset operation and thereby provide both a quick and accurate technique for determining the $X_r$ switch set calibration values. It will be understood that other switches, such as for power off/on and for controling the saw motor power, may also be provided on this front panel.

Figure 11:
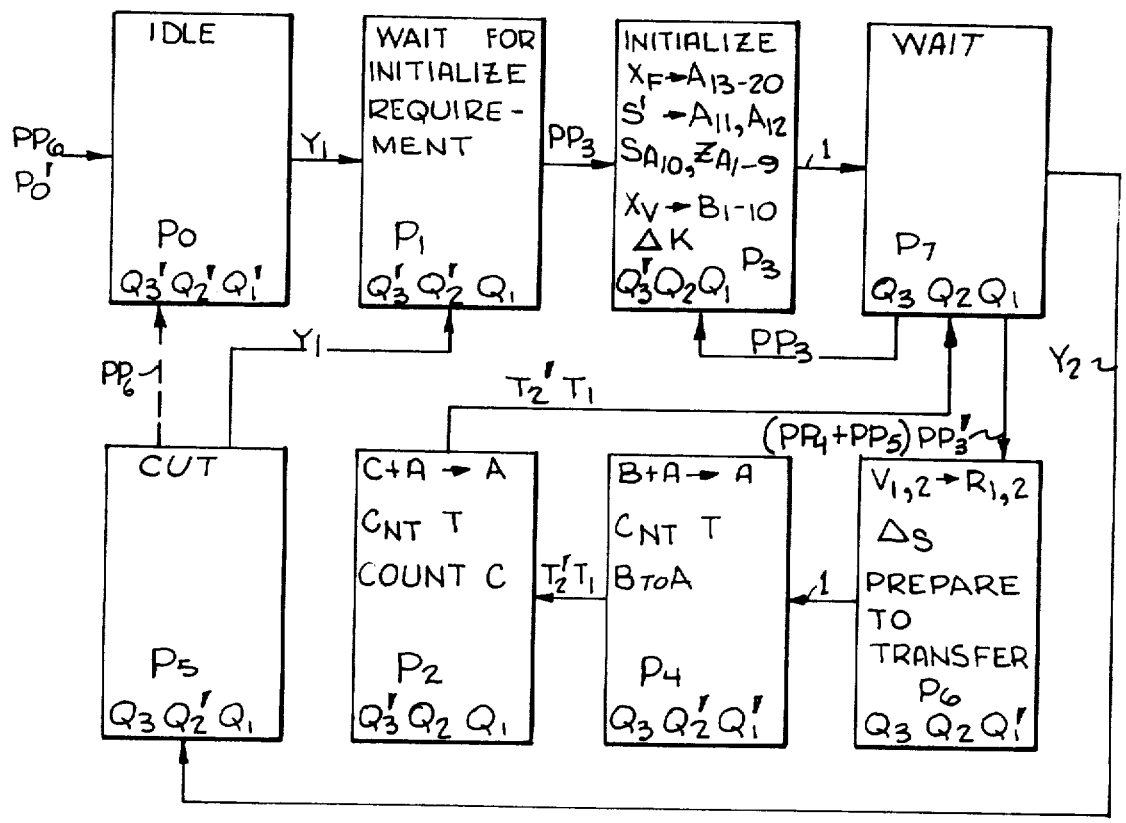
FIG. 11 is a programming diagram representing the logical operation of the measuring system logic.

The programming diagram of FIG. 11 shows the eight programs formed by the $Q_1$, $Q_2$, and $Q_3$ flip-flops, the logic operations ordered by each, and the logical conditions which order each program change. These operations, the program transfers, and the display logic are discussed separately in the following paragraphs.

Prior to this description, however, the logic involved in determining the coarse distance, i.e., fiducial unit reading, of the workpiece length is established. In particular, an expression $F_1F_2'$ is mechanized which, when "1," indicates that the coarse or fiducial measurement lies between the $F_1$ and $F_2$ fiducial units. In the same way, the remaining terms $F_2F_3'$, $F_3F_4' < \cdots F_{i-1}F_i', \ldots F_{39}F_{40}'$ are mechanized by individual gates and produce an output "1" only when the end of the workpiece lies between the fiducial unit corresponding to the first term and the second term's fiducial unit.

1. General System Reset to $P_0$ ($Q_1'Q_2'Q_3'$)

A general clear or reset operation is automatically ordered by the absence of any light beam obscuration. Hence, whenever the table is clear, for example following the removal of a workpiece following a cutting operation, an automatic idle or $P_0$ program is obtained. The logic and other expressions which order this reset are time shared with the display and are derived later in connection the display logic.

First of all, a set of expressions is formed from the various $F_{i-1}'F_i$ terms in which these terms are grouped in accordance with the least significant decimal digit which they represent. In particular, all fiducial units positioned at 10, 20, 30 and 40 feet, ignoring $X_F$ and K for the moment, from the measurement point are grouped under "0" or $M_0$, while those at 1, 11, 21 and 31 feet are grouped under $M_1$ or "1." The set of expressions are $$M_0 = F_{10}F_{11}' + F_{20}F_{21}' + F_{30}F_{31}' + F_{40} \quad (1\text{-}1)$$
$$M_1 = F_1F_2' + F_{11}F_{12}' + F_{21}F_{22}' + F_{31}F_{32}' \quad (1\text{-}2)$$
$$M_2 = F_2F_3' + F_{12}F_{13}' + F_{22}F_{23}' + F_{32}F_{33}' \quad (1\text{-}3)$$
$$M_3 = F_3F_4' + F_{13}F_{14}' + F_{23}F_{24}' + F_{33}F_{34}' \quad (1\text{-}4)$$
$$M_4 = F_4F_5' + F_{14}F_{15}' + F_{24}F_{25}' + F_{34}F_{35}' \quad (1\text{-}5)$$
$$M_5 = F_5F_6' + F_{15}F_{16}' + F_{25}F_{26}' + F_{35}F_{36}' \quad (1\text{-}6)$$
$$M_6 = F_6F_7' + F_{16}F_{17}' + F_{26}F_{27}' \; 30 \; F_{36}F_{37}' \quad (1\text{-}7)$$
$$M_7 = F_7F_8' + F_{17}F_{18}' + F_{27}F_{28}' + F_{37}F_{38}' \quad (1\text{-}8)$$
$$M_8 = F_8F_9' + F_{18}F_{19}' + F_{28}F_{29}' + F_{38}F_{39}' \quad (1\text{-}9)$$
$$M_9 = F_9F_{10}' + F_{19}F_{20}' + F_{29}F_{30}' + F_{39}F_{40}' \quad (1\text{-}10)$$

Two additional equations, employed for determining the occurrence of a fiducial make/break operation, effectively divide the fiducial units, grouped as above, into odd and even terms, as follows:

$$PP_1 = (M_1 + M_3 + M_5 + M_7 + M_9) \quad (1\text{-}11)$$
$$PP_0 = (M_0 + M_2 + M_4 + M_6 + M_8) \quad (1\text{-}12)$$

$PP_1$ and $PP_2$ will alternate between "1," "0" and "0," "1" states, respectively, so long as at least one or more fiducial light beams are intersected by the workpiece. However, if all fiducial light units are clear, both PP terms will be false and a reset accordingly ordered by:

$$Z_{Q1} = Z_{Q2} \; Z_{Q3} = PP_1'PP_1' \quad (1\text{-}13)$$

It will of course be appreciated that time lags may occur in the various signals coming from the fiducial units due to their relatively remote location from the logic unit. This could result in $PP_1$ and $PP_2$ being simultaneously "1" or "0" for momentary intervals of time. If this should occur, its logical effects can be overcome in a number of ways. For example, the $PP_1' \; PP_2'$ proposition can be employed to trigger a delay multivibrator or equivalent flip-flop network and the end of the delay used to determine whether a true table clear condition exists as opposed to the momentary logic condition noted. Alternately, only an odd or an even term need be mechanized and it, along with its complement, used instead of the two terms here indicated.

2. Idle or $P_0$, ($Q_3'Q_2'Q_1'$)

The only operations taking place during this program are described later when their meaning will be more apparent.

3. Transfer from $P_0$ to $P_1$ ($S_{Q1}$)

This program transfer takes place upon depression of the "-measure" or $Y_1$ pushbutton by the operator after the workpiece has been positioned on the table with at least one light beam broken. The term for this program change is:

$$S_{Q1} = P_0Y_1 \quad (3\text{-}1)$$

4. Wait for Initialize, $P_1$, ($Q_3'Q_2'Q_1$)

The first operation ordered by the $P_1$ program is to energize the relay controlling the power to the roller assembly solenoid with the result that the roller is raised and makes contact with the workpiece. This energization of the roller continues through all programs except the first and last, $P_0$ and $P_5$, for reasons explained later. The logic ordering the energization is:

Roller Relay "ON" = $P_0'P_5'$ \quad (4-1)

5. Transfer from $P_1$ to $P_3$, ($S_{Q2}$)

In accordance with the earlier explanation of the interaction between the fiducial and quantizer subsystems, it is apparent that the reading obtained after workpiece placement will not be accurate until the lateral offset value $X_f$ has been inserted in the memory and displayed. This operation, termed initialize, takes place after each fiducial make/break occurrence and program $P_1$ is transformed into the initialize program $P_3$ by detection of the fiducial system's status change. In particular, this change of state is detected by the odd-even logic (equations 1–11, 1–12) and the 0 flip-flop, which is triggered during specified programs to correspond to the most recent odd-even value. Any difference between the state of 0 on one hand and $PP_1$ and $PP_2$ on the other, indicates a change of fiducial system status and the requirement of an initialize operation. In particular, during equilibrium, 0 corresponds to odd and 0' to even, and a change of state by:

$$PP_3 = 0'(PP_1) + 0(PP_2) \qquad (5\text{-}1)$$

The program switch to $P_3$ is as follows:

$$S_{Q2} P_1(PP_3) \qquad (5\text{-}2)$$

6. Initialize, $P_3$, $(Q_3'Q_2Q_1)$

This single clock time initialize program begins during the first half of the clock signal by ordering all A and B register flip-flops zeroed via their asynchronous input zeroing terminals. Since the type of flip-flops assumed employed are triggered by a "0" or ground level signal on their asynchronous input terminals, the term $(P_3c1')$ would normally be "1" during the first half clock cycle of $P_3$ based on the previous definition of $c1'$, while its prime, or $(P_3C1')'$, would be "0" during this same first half. Hence, the A and B register zeroing expressions are:

$$A_{Z\ A1-20}, A_{Z\ B1-10} = [.. + P_3c1' + ..]' \qquad (6\text{-}1)$$

The .. +, etc. terms denote that other zeroing expressions will be described and included later.

The $X_{f1-8}$ and $X_{r1-10}$ toggle switch values are transferred into $A_{13-20}$ and the $B_{1-10}$ flip-flops through their asynchronous set input terminals during the last half of the clock interval. This is accomplished by applying the proposition $(P_3c1')'$ in common to all movable switch arms of the toggle switches. Then, since each contact point is connected to the asynchronous set input terminal of its associated flip-flop, a closed or "1" switch position will pass this expression to its associated input terminal with the result that the previously zeroed flip-flop will be set. An open toggle switch, corresponding to "0," on the other hand, passes no signal to the flip-flop with the result it remains at its zero state.

The expressions for the above described connections are:

$$A_{S\ A13-20} = [X_{f1-8}] (P_3c1)' \qquad (6\text{-}2)$$
$$A_{S\ B1-10} = [X_{r1-10}] (P_3c1)' \qquad (6\text{-}3)$$

The next operation is the triggering of the K flip-flop to maintain the correct footage reading in the display. As was explained earlier in connection with FIGS. 7 and 8, a workpiece end position just to the right of a fiducial unit, as will occur for a positive direction of travel following a status change, requires K' for a correct reading. On the other hand, a negative direction of travel resulting in an end point position just to the left of a fiducial unit, requires a K state to establish the proper footage display. Accordingly, K is triggered, based on state of the S flip-flop, which holds the sign of the quantizer operation and hence the direction of movement of the workpiece. In particular, S represents positive and S' negative motion. The expressions for K are:

$$S_K = S' P_3 + \ldots \qquad (6\text{-}4)$$
$$Z_K = S P_3 + \ldots \qquad (6\text{-}5)$$

The initialize operation, ordered by $PP_3$, indicated a difference between the odd and even propositions $PP_1$ and $PP_2$ on one hand and the state of the 0 flip-flop on the other. Accordingly 0 is triggered to correspond to $PP_1$ and $PP_2$, in order that the next initialized requirement can be determined. Also, this triggering operation is additionally ordered during the $P_0$ and $P_5$ programs, with the entire expressions being:

$$S_0 = 0'(PP_1)(P_0 + P_3 + P_5) \qquad (6\text{-}6)$$
$$Z_0 = 0(PP_2)(P_0 + P_3 + P_5) \qquad (6\text{-}7)$$

7. Program Transfer from $P_3$ to $P_7$ ($SQ_3$)

$P_3$ lasts one clock time and is automatically transferred into $P_7$ as follows:

$$S_{Q3} = P_3 \qquad (7\text{-}1)$$

8. Wait, $P_7$, $(Q_3Q_2Q_1)$

This program exists between the initialize program $P_3$ on one hand and a series of quantizing programs $P_6$, $P_4$, and $P_2$ on the other hand. The principal function performed is a fix-up operation which essentially converts the basic radix 16 counting system of $A_{17-20}$ into the desired radix 12 system. This requirement occurs only after a negative overflow for negative motion on the attainment of 12 inches (1100) for positive motion. In the latter case, the 12 inches (1100 binary) must be changed to 00 inches (0000 binary) and the K flip-flop set to order the next higher footage reading. In the former case, the inch value of 1111 (binary) (which is not decoded for readout purposes) must be changed to 11 inches (decimal) corresponding to 1011 (binary) and the K flip-flop zeroed to represent the next lower footage reading. In terms of flip-flop changes, $A_{20}$ is zeroed for the 12 inches (1100 → 0000) reading only, while $A_{19}$ is zeroed in both cases.

In addition, an $X_{u'}$ switch is employed which, when "on," serves to disable the $P_7$ operation on the $A_{18,19}$ flip-flops with the result the $A_{17-20}$ readings remain in binary form and can be read out, for example, by individual lights on the front panel. This function is useful during the $X_r$ calibration operation in which an accumulated reading over a number of feet may be desired to determine an average $X_r$ value. Thus, this $A_{19,20}$ adjustment takes place only during $X_{u'}$.

In the equations for $A_{19}$, $A_{20}$ and K, it was elected to zero $A_{19}$ and $A_{20}$ via their asynchronous terminals. As a result, the asynchronous set and zero terminals of K were also employed. It will be appreciated, however, that corresponding synchronous input terminal mechanizations for these expressions and flip-flops be employed, particularly if any undesired race conditions occur in the actual mechanization. The equations for $A_{19}$, $A_{20}$ and K are:

$$A_{Z_{A19}} = [+ A_{20}A_{19}P_7X_{u'}' + \ldots] \qquad (8\text{-}1)$$
$$A_{Z_{A20}} = [+ A_{20}A_{19}A_{18}'P_7X_{u'}' + \ldots] \qquad (8\text{-}2)$$
$$A_{S_K} = (A_{20}A_{19}A_{18}'P_7)' \qquad (8\text{-}3)$$
$$A_{Z_K} = (A_{20}A_{19}A_{18}P_7)' \qquad (8\text{-}4)$$

Finally, the C flip-flop, holding the carry of the yet to be described B to A addition or subtraction during the quantizing operation is ordered zeroed since it will end up in its set condition following any A register negative overflow, as it goes from positive to negative. The expression for this operation is:

$$Z_C = + P_7 + \qquad (8\text{-}5)$$

9. Program Transfer from $P_7$ to $P_3$ ($Z_{Q3}$)

This transfer takes place following each fiducial unit change and is make/break occurrence ordered by the same logical conditions producing the $P_1$ to $P_3$ transfer assuming $X_{u'}'$. That is, if $X_{u'}$ is "on," this program is inhibited to prevent the ensuing loss of quantized information by the automatic $X_f$ transfer into the A register. The expression involved is:

$$Z_{Q3} = + P_7(PP_3) X_{u'}' + \ldots \qquad (9\text{-}1)$$

10. Program Transfer from $P_{Q1}$ to $P_6$ ($Z_{Q1}$)

This program transfer is ordered whenever the quantizing logic indicates that a positive or negative incremental change has occurred in the rotational position of the roller. To define this program change, it is necessary to first describe the detailed logic involved in the quantizer's operation and reference is taken to the flow diagram of FIG. 12a and the quantizer signal sequence of FIG. 12b.

Figure 12:
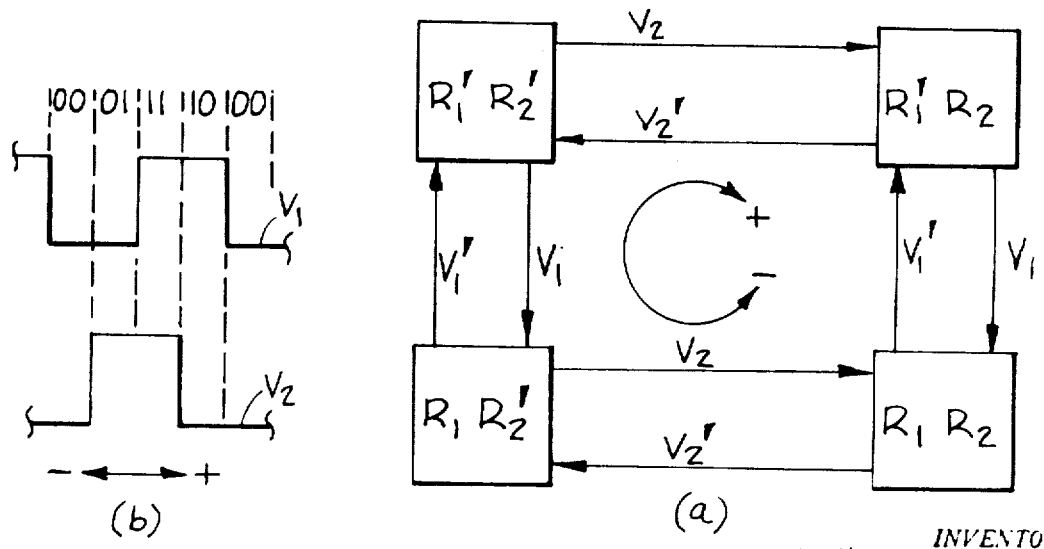
FIGS. 12a and 12b represent the digitizer's logical operation and signal sequence.

The quantizer, which may be for example, an optical incremental encoder of the type manufactured by the Norden Division of United Aircraft Corporation, produces a pair of two level output signals, $V_1$ and $V_2$, as indicated in FIG. 12b. The sequence of $V_1,V_2$ of 00 to 01 to 11 to 10, etc., is defined as being in the positive, or plus, direction with each step in the sequence corresponding to one increment of rotation. Each step in the reverse sequence, i.e., 00 to 10 to 11 to 01, etc., is taken as a negative or −1 rotational increment. The values of the $V_1$ and $V_2$ signals are, at specified times defined shortly, dumped into the $R_1$ and $R_2$ flip-flops. Then, any difference between $V_1V_2$ and $R_1R_2$ indicates that an incremental rotation has occurred and a quantizing operation is ordered within the logic unit. FIG. 12a shows the assumed programming sequence and from it, the expressions for (+1) and (−1) rotational increments can be obtained as:

$$(+) = PP_4 = (R_1 \oplus V_2)(R_2 \oplus V_1)' \quad (10\text{-}1)$$
$$(-) = PP_5 = (R_1 \oplus V_2)'(R_2 \oplus V_1) \quad (10\text{-}2)$$

The $P_1$ to $P_2$ transfer is ordered by a logical difference between $R_1$ and $R_2$ on one hand and $V_1V_2$ on the other, with the further restriction that no concurrent initialized order exists since the initialize operation has precedence over a quantizer one. The transfer expression is:

$$Z_{Q1} = P_7(PP_4 + PP_5) PP_3' \quad (10\text{-}3)$$

11. $P_6$, Prepare to Transfer, $(Q_3Q_2Q_1')$

This operation, which lasts one clock interval, orders the $V_1$ and $V_2$ values transferred into $R_1$ and $R_2$ and places the sign of the quantizer movement into the S flip-flop which, in turn, orders an additive or subtractive transfer of B (holding $X_r$) into the A register during the subsequent $P_4$ and $P_2$ programs. This same set of V into R and sign into S operations were also ordered during the $P_1$ or wait for initialize program. They were required earlier in order to get the direction of travel into the S flip-flop, prior to initialize, so that (1) $K$ could be properly set for read out purposes, and (2) the R values will correspond to V during the wait program $P_7$. It will be recalled that S and S' are employed to represent plus and minus directions of movement, respectively. The expressions are:

$$S_{R1} = V_1(P_1 + P_6) \quad (11\text{-}1)$$
$$Z_{R1} = V_1'(P_1 + P_6) \quad (11\text{-}2)$$
$$S_{R2} = V_2(P_1 + P_6) \quad (11\text{-}3)$$
$$Z_{R2} = V_2'(P_1 + P_6) \quad (11\text{-}4)$$
$$S_s = PP_4(P_1 + P_6) \quad (11\text{-}5)$$
$$Z_s = PP_5(P_1 + P_6) \quad (11\text{-}6)$$

12. Transfer from $P_6$ to $P_4$ $(Z_{Q2})$

This transfer is automatic and is given by:

$$Z_{Q2} = P_6 \quad (12\text{-}1)$$

13. $P_4$, B to A Transfer $(Q_3Q_2'Q_1')$

During this program, lasting 10 clock intervals, the $B$ register holding $X_r$, is recirculated and added or substracted, based on the state of the S flip-flop, to the $A_1$ through $A_{10}$ flip-flops, also recirculated through $A_{20}$. The C flip-flop is used for holding the carries generated by the B to A transfer operation. The equations are:

$$S_{A20} = (A_1 \oplus C \oplus B_1)P_4 \quad (13\text{-}1)$$
$$Z_{A20} = (S_{A20})'P_4 \quad (13\text{-}2)$$
$$S_C = C' (S \oplus A_1) 'B_1P_4 \quad (13\text{-}3)$$
$$Z_C = C(S \oplus A_1)B_1'P_4 \quad (13\text{-}4)$$
$$S_{B10} = B_1 \quad (13\text{-}5)$$
$$Z_{B10} = B_1' \quad (13\text{-}6)$$

The length of this program is determined by the $T_1$ through $T_5$ flip-flops which are connected as follows:

$$S_{T1} = T_2 \quad (13\text{-}7)$$
$$Z_{T1} = T_2' \quad (13\text{-}8)$$
$$S_{T2} = T_3 \quad (13\text{-}9)$$
$$Z_{T2} = T_3' \quad (13\text{-}10)$$
$$S_{T3} = T_4 \quad (13\text{-}11)$$
$$Z_{T3} = T_4' \quad (13\text{-}12)$$
$$S_{T4} = T_5 \quad (13\text{-}13)$$
$$Z_{T4} = T_5' \quad (13\text{-}14)$$
$$S_{T5} = T_1' \quad (13\text{-}15)$$
$$Z_{T5} = T_1 \quad (13\text{-}16)$$

Assuming all T flip-flops are initially "0", an applied clock signal will produce nine consecutive, unique states, which are followed again by all 0's, giving a total of 10 states. The unique state just before all zeroes appears for the second time is represented by $T_2'T_1$.

A clock is applied to the $A$, $B$ and $T$ registers during both this and the following $P_2$ program. The equations for their clock trigger signals are:

$$T_{A1-20} = T_{B1-20} = T_{T1-5} = (P_2 + P_4)C1 \quad (13\text{-}17)$$

14. Program Transfer from $P_4$ to $P_2$, $(S_{Q2}, Z_{Q3})$

As noted above, the final clock time of $P_4$ is $T_2'T_1$ which orders the program switch, as follows:

$$S_{Q2} = P_4T_2'T_1 \quad (14\text{-}1)$$

$$Z_{Q3} = P_4T_2'T_1 \quad (14\text{-}2)$$

15. Count C program, $P_2$ $(Q_3'Q_2Q_1')$

This program continues the $P_4$ program to the extent that any carry remaining in $C$ at the end of $P_4$ is propogated down the $A_{10-20}$ flip-flops. The key expressions are:

$$S_{A20} = (A_1 \oplus C) P_2 \quad (15\text{-}1)$$
$$Z_{A20} = (S_{A20})'P_2 \quad (15\text{-}2)$$
$$Z_C = C(S \oplus A_1)P_2 \quad (15\text{-}3)$$

16. Program Transfer from $P_2$ to $P_7$ $(S_{Q1}, S_{Q3})$

The transfer back from $P_2$ to the Wait $P_7$ program is ordered by the final count of the T counter as follows:

$$S_{Q1} = P_2T_2'T_1 \quad (16\text{-}1)$$
$$S_{Q3} = P_2T_2'T_1 \quad (16\text{-}2)$$

17. Program Transfer from $P_7$ to $P_5$ $(Z_{Q2})$

The $P_5$ program, described next, is entered by depression of the $Y_2$ or "cut" pushbutton, just before a cut is to be made on the workpiece. The transfer expression is:

$$Z_{Q2} = P_7Y_2 \quad (17\text{-}1)$$

18. Cut Program $P_5$ $(Q_3Q_2'Q_1)$

The solenoid driving the roller into engagement with the workpiece is de-energized in accordance with previously given equation 4-1. The roller will then drop beneath the cutting table and be protected from possible damage during the subsequent cutting and unloading operation. In addition, the quantizing subsystem is effectively disabled so that the reading obtained just prior to depression of $Y_2$ will remain displayed. This is required since the downward roller movement following the solenoid de-energization will in general result in a rotational movement being given the roller with a subsequent continuation of the quantizing action. No other logic operations are performed during this program. When the cutting operation is completed and the workpiece is removed from the table assembly, an automatic clearing is produced by $PP_6$, and the idle program $P_0$ re-entered. One optional program transfer, described next, is provided.

19. Program Transfer, $P_5$ to $P_1$ $(Z_{Q3})$

In the event the operator wishes to remeasure, change, or check the workpiece length for any reason, he can, in $P_5$, depress the $Y_1$ or measure pushbutton and a transfer to $P_1$ will be taken as follows:

$$Z_{Q3} = P_5Y_2 \quad (19\text{-}1)$$

20. Display Logic, Feet

The logic for the units place digit indicator 70-2 of the footage section of the measurement is based on equations 1-1 through 1-9, given earlier, which relate the units digit to the further right fiducial unit light which is intersected by the end of the workpiece. These equations must be converted to actual footage measurement based on the state of the K flip-flop, as follows:

$$MM_1 = M_0K + M_1K' \quad (20\text{-}1)$$
$$MM_2 = M_1K + M_2K' \quad (20\text{-}2)$$
$$MM_3 = M_2K + M_3K' \quad (20\text{-}3)$$
$$MM_4 = M_3K + M_4K' \quad (20\text{-}4)$$
$$MM_5 = M_4K + M_5K' \quad (20\text{-}5)$$
$$MM_6 = M_5K + M_6K' \quad (20\text{-}6)$$
$$MM_7 = M_6K + M_7K' \quad (20\text{-}7)$$
$$MM_8 = M_7K + M_8K' \quad (20\text{-}8)$$
$$MM_9 = M_8K + M_9K' \quad (20\text{-}9)$$

These equations are decoded into an 8-4-2-1 BCD system, corresponding to the input logic requirements for the Nixie readout as follows, where $N_2(8)$, $N_2(4)$, $N_2(2)$, and $N_2(1)$ drive logic correspond to 70-2 of FIG. 10:

$$N_2(1) = (MM_1 + MM_3 + MM_5 + MM_7 + MM_9) \quad (20\text{-}10)$$
$$N_2(2) = (MM_2 + MM_3 + MM_6 + MM_7) \quad (20\text{-}11)$$
$$N_2(4) = (MM_4 + MM_5 + MM_6 + MM_7) \quad (20\text{-}12)$$
$$N_2(8) = (MM_8 + MM_9) \quad (20\text{-}13)$$

The term for "0" or $MM_0$ is not decoded since the lack of a "1" signal applied to the 8-4-2-1 Nixie drivers is automatically treated as a "0" and displayed accordingly.

The decoding logic for the tens place digit of the decimal footage read out first separates out all readings between 10 and 19 for a "1," 20 to 29 for a "2," and 30 to 39 for a "3" in accordance with the following equations, where the $N_1(4)'$ of 20-16 is defined in the next set of equations:

$$NN_4 = (F_9K + F_{10} + F_{19}K')F_{20}' (NN_5)' \quad (20\text{-}14)$$

$$NN_5 = (F_{19}K + F_{20} + F_{29}K')F_{30}'(NN_6)' \quad (20\text{-}15)$$
$$NN_6 = (F_{29}K + F_{30} + F_{39}K')F_{40}'[N_1(4)]' \quad (20\text{-}16)$$

These, in turn, are decoded into the 8–4–2–1 digits for the 70–1 or $N_1$ logic readout driver, as follows, recalling that $F_{40}$ represents a measurement of 40 feet:

$$N_1(1) = NN_4 + NN_6 \quad (20\text{-}17)$$
$$N_1(2) = NN_5 + NN_6 \quad (20\text{-}18)$$
$$N_1(4) = F_{39}K + F_{40} \quad (20\text{-}19)$$
$$N_1(8) = 0 \quad (20\text{-}20)$$

21. Display Logic, Inches

A $A_{17}$ through $A_{20}$ flip-flops hold the inches portion of the measurement, which is displayed by the ten and unit place digits display sections 70–3 and 70–4, respectively. The tens unit will be "1" for 10 or 11 inches, represented logically by $A_{20}A_{18}$ with the 8–4–2–1 values of the $N_3$ decode being:

$$N_3(1) = A_{18}A_{20} \quad (21\text{-}1)$$
$$N_3(2) = 0 \quad (21\text{-}2)$$
$$N_3(4) = 0 \quad (21\text{-}3)$$
$$N_3(8) = 0 \quad (21\text{-}4)$$

The logic for the inch units place digits for the 70–4 readout is, recognizing that the $A_{20}$ through $A_{17}$ flip-flops values correspond to 8,4,2,1 BCD values, respectively, except for 10 and 11, inches, is:

$$N_4(1) = A_{17} \quad (21\text{-}5)$$
$$N_4(2) = A_{18}(A_{20}A_{18})' \quad (21\text{-}6)$$
$$N_4(4) = A_{19} \quad (21\text{-}7)$$
$$N_4(8) = A_{20}(A_{20}A_{18})' \quad (21\text{-}8)$$

22. Display Logic, Fractional Inches

The $A_{13}$ through $A_{16}$ flip-flops hold the fractional inch measurement and has two numerator digits, 70–5 and 70–6 which are decoded by $N_5$ and $N_6$, respectively, and two denominator digits 70–7 and 70–8 decoded by $N_7$ and $N_8$, respectively. Unit 70–5 will be one for 11/16, 13/16 and 15/16 values and zero for all other readings. The resulting $N_5$ expressions are:

$$N_5(1) = A_{16}(A_{15} + A_{14})A_{13} \quad (22\text{-}1)$$
$$N_5(2) = 0 \quad (22\text{-}2)$$
$$N_5(4) = 0 \quad (22\text{-}3)$$
$$N_5(8) = 0 \quad (22\text{-}4)$$

Before setting forth the specific $N_6$ decoding terms, certain background expressions should be established. In particular, a reading of one-half will be characterized by $A_{16}A_{15}'A_{14}'A_{13}'$, any reading of a fourth, i.e., ¼, ¾, by $A_{15}A_{14}'A_{13}'$ and any eighth, i.e., ⅛, ⅜, ⅝, or ⅞ by $A_{14}A_{13}'$. These are made up separately as:

$$NN_1 = A_{16}A_{15}'A_{14}'A_{13}' \quad (22\text{-}5)$$
$$NN_2 = A_{15}A_{14}'A_{13}' \quad (22\text{-}6)$$
$$NN_3 = A_{14}A_{13}' \quad (22\text{-}7)$$

The $N_6$ logic term $N_6(1)$ will be "on" for any reading other than "00/00" fractional inches while $N_6(2)$ will be "1" for 3/16, 7/16, 13/16, 3/8, 7/8, and 3/4 inches. $N_6(4)$ will be "1" for 5/16, 7/16, 15/16, 5/8 and 7/8 inches, while $N_6(8)$ will be "1" for 9/16. The simplified expressions meeting these number readout requirements are:

$$N_6(1) = A_{13} + NN_1 + NN_2 + NN_3 \quad (22\text{-}8)$$
$$N_6(2) = A_{14}A_{16}'(A_{13}'A_{15}')' + A_{15}A_{16}(A_{13}A_{14})' \quad (22\text{-}9)$$
$$N_6(4) = A_{13}A_{15}(A_{14}'A_{16})' + A_{13}A_{14}A_{16} \quad (22\text{-}10)$$
$$N_6(8) = A_{13}A_{16}A_{14}'A_{15}' \quad (22\text{-}11)$$

The $N_7$ logic is "1" for sixteenth inch readings only, corresponding to $A_{13}$. Hence, $$N_7(1) = A_{13} \quad (22\text{-}12)$$
$$N_7(2) = 0 \quad (22\text{-}13)$$
$$N_7(4) = 0 \quad (22\text{-}14)$$
$$N_7(8) = 0 \quad (22\text{-}15)$$

Considering the $N_8$ logic, $N_8(2)$, $N_8(4)$ and $N_8(8)$ will be "1" for half, quarter, and eighth readings, respectively, corresponding to $NN_1$, $NN_2$, and $NN_3$, respectively. In addition, $N_8(2$ and $N_8(4)$ will be at simultaneously "1" for all sixteenth inch readings, corresponding to $A_{13}$. Hence:

$$N_8(1) = 0 \quad (22\text{-}14)$$
$$N_8(2) = A_{13} + NN_1 \quad (22\text{-}15)$$
$$N_8(4) = A_{13} + NN_2 \quad (22\text{-}16)$$
$$N_3(8) = NN_3 \quad (22\text{-}17)$$

The final FIG. 10 display units to be described are the pair of indicator lights $L_1$ and $L_2$ at 95 and 96, respectively. Light $L_1$ is driven through an appropriate current driver by the clear program $PP_6$ and may be designated "Ready" or "Load." It serves to indicate to the operator that the table is clear and ready for the next measuring and cutting operation. In the event the light is "off" and the table is nevertheless clear, a fiducial unit, particularly light source or photo cell, malfunctioning is indicated. The second or $L_2$ light is energized by the cut program $P_5$ and may be designated "Cut" to thereby indicate to the operator that the measuring sequence has been completed and a cut can be taken.

The driving expressions for these two lights are:

$$L_1 = PP_6 \quad (22\text{-}18)$$
$$L_2 = P_5 \quad (22\text{-}19)$$

The sequence followed in manually operating the linear measuring system of the present invention attached, as described, to a cutting and roller assembly begins with an empty table which is indicated by the front panel $L_1$ or "load" light being "on." Once the operator loads the table, and breaks one or more of the beams, the "load" light goes off. The operator then pushes the $Y_1$ or "measure" pushbutton to produce the $P_1$ program and subsequent roller engagement with the workpiece. He then laterally moves the workpiece until a fiducial unit beam is either broken or opened at which time an accurate measurement is available for the first time. It may be noted that the inches and fractions of an inch portion of the output display could be maintained dark up until this point in the measurement cycle by inserting a relay, for example, in the high voltage power supply driving the involved readout units. The relay would be at first normally open until after the initialization at which time it would be driven to its closed position thereby lighting up the inches and fractions of an inch section of the display. The approach would mean that the operator would view only accurate readings which represented the true workpiece measurement.

After the workpiece has been moved to the desired measured length, it is clamped and the $Y_2$ or "cut" pushbutton depressed which causes the $P_5$ program to be entered and the front panel $L_2$ or "cut" light is energized to indicate that a cut can then be taken. The roller is disengaged and the cutting operation can be initiated through the particular cutting mechanism's control panel.

If, prior to taking the actual cut, the operator determines for any reason, that another measurement is desired, he can depress the $Y_1$ pushbutton and thereby reinstitute the measurement sequence. In any event, following the cutting operation and removal of the workpiece so that none of the fiducial units' lights are blocked, the $P_0$ program is automatically re-entered and the "load" light goes back on.

It will be apparent to those skilled in the art that a number of detailed changes can be made in the linear measuring system of the present invention without involving invention. One of the more obvious modifications would be to use fewer fiducial units spaced at integral numbers of measuring units or feet apart. This modification is feasible if actual practice indicates relatively accurate, repeatable inter-fiducial unit measurements can be achieved and maintained by the quantizing subsystem over distances greater than the assumed one foot fiducial unit spacing. Such a modification would require additional carry flip-flops which would be triggered to count up or down between fiducial units. For example, two carry flip-flops could handle 2 and 3 foot spacings, while three flip-flops could be logically wired to handle up to 7 foot spacings.

The feet decoding logic would, of course, have to be modified to accommodate the fewer fiducial units and increased numbers of carry flip-flops. In any event, it will be apparent to those skilled in the art as to what logic modifications are required in both the carry flip-flops and decoding logic to permit multiple measurement unit spacings between fiducial units.

It is also apparent that the minimum readout resolution of one-sixteenth inch is arbitrary and other resolutions, say to one-eighth or one thirty-second of an inch, or other fractional values could be decoded and displayed, as required.

It will also be obvious that other than the feet, inches, and fractions of an inch English measuring system units can be employed in the linear measuring system of the present invention without involving invention. For example, the metric system could be employed with a somewhat simpler display decoding network resulting. Scale-of-10 counters would be required in the A flip-flop channel for handling the quantizing subsystem outputs.

The individual construction of the fiducial units and their placement on the roller table represent another area where a number of modifications can be made without involving invention. Not only can the actual shape of individual units be modified, as may be dictated by particular roller assembly configurations, but phenomena other than light beams employed for sensing the adjacent present of the workpiece. Mechanical arms operating against toggle switches, E-transformers, etc., represent lower cost and lower accuracy devices which might be suitable for some applications.

In addition, other ways of holding the light sources and photocell-amplifier units will be obvious to those skilled in the art without involving invention. For example, the series of light sources could be inserted into a series of spaced holes in a steel beam, for example, and a corresponding set of photocells-amplifiers inserted into a corresponding series of holes in another beam. Then, the two beams could be mounted, facing each other, to the roller assembly frame and appropriately aligned for operation.

Finally, it will be apparent that the present linear measuring system is not limited to measuring lengths of metal beams, rods, bars, etc., and other material forms whose lengths greatly exceed their cross-sectional dimensions. For example, the present measuring system can obviously be employed for measuring the amount of projection of any opaque material past some initial measuring point. Sheets, wires, etc., could be readily measured by the present system by suitable, obvious modifications of the described system without involving invention.

It will be appreciated by those skilled in the art, that the foregoing disclosure relates only to a detailed preferred embodiment of the invention whose spirit and scope is set forth in the appended claims.

What is claimed is:

1. A linear measurement device for measuring the linear distance to the end of a member extends beyond a measuring point, said device comprising: a series of discrete digital sensing means linearly spaced a series of distances, respectively, from said measuring point, each of said digital sensing means being responsive to the adjacent presence of said member for producing an output digital signal, the length of said member along said series of sensing means producing a continuous set of said output digital signals corresponding thereto; first digital measuring means responsive to the particular digital sensing means producing the last output digital signal of said continuous set of digital signals for producing a first output digital numerical indication corresponding to the distance said particular digital sensing means is from said measuring point; second digital measuring means responsive to the distance the end of said member extends past said particular digital sensing means for producing a second output digital numerical indication corresponding thereto; means for combining said first and second output digital numerical indications to produce a third output digital numerical indication representing the total measured distance the end of said member extends beyond said measuring point and output digital display means responsive to the third output digital numerical indication produced by the last-named means for producing an output visual indication corresponding thereto and representing said measured distance.

2. The linear measurement device according to claim 1 wherein said first digital measuring means includes, in addition, digital offset means for modifying said first output digital indication an amount corresponding to the distance said series of discrete sensing means are offset as a group from said measuring point whereby any offset distance of the series of discrete sensing means can be accounted for in the measuring operation.

3. A linear measurement device for measuring the distance the end of a member extends beyond a measuring point, said member lying along a path, said device comprising: a series of first discrete sensing means lying along said path, each of said first discrete sensing means producing first and second output signals in response to the adjacent presence and non-presence, respectively, of said member along said path; decoding means responsive to the adjacent pair of first discrete sensing means producing first and second signals, respective, for producing a first numerical indication corresponding to the distance said adjacent pair of sensing means are positioned along said path from said measuring point; second sensing means responsive to the movement of said member between said adjacent pair of first discrete sensing means for generating a second numerical indication representing the distance the end of said member is between said adjacent pair; and display means responsive to said first and second numerical indications for visually displaying first and second numbers, respectively, representing said measurement.

4. The device according to claim 3 wherein said second sensing means includes, in addition, incremental means responsive to each incremental movement of said member for producing a signal indication thereof, and digital summing means for summing said signal indications to derive said second numerical indication representing a measurement of the distance traveled by said member between said adjacent pair of sensing means.

5. The device according to claim 4 wherein said incremental means includes movable means for undergoing rotational movement in response to the movement of said member, and quantizing means coupled to said movable means and responsive to each incremental rotational movement for producing said signal indication.

6. The device according to claim 5 including, in addition, means responsive to each change of adjacent pairs of said first discrete sensing means producing said first and second signals as decoded by said decoding means for producing an output logical signal correspondingly thereto, wherein each change of said first numerical indication is represented by the appearance of said output logical signal.

7. The device according to claim 6 in which said series of first discrete sensing means are at a first distance from each other, and the initial discrete sensing means of said series is spaced at a second distance from said measurement point, said device including, in addition, numerical means holding said second distance and responsive, when actuated, for transferring said second distance into said digital summing means, and means responsive to each of said output logical signals for actuating said numerical means whereby the distance measured by said second sensing means is updated to said second distance at each new length determined by said decoding means.

8. The device according to claim 7 in which said second sensing means includes, in addition, carry means responsive when actuated for going from a first to a second state, and said summing means includes, in addition, reset means responsive to a first predetermined sum for resetting said summing means to a second predetermined sum and actuating said carry means whereby the total count represented by said summing means and said carry means cycles through a predetermined number system upon the continued movement of said member.

9. The device according to claim 8 wherein said first display means includes, in addition, means responsive to the first and second states of said carry means for producing first and second output number values for said first numerical indication, said values differing by a single unit of measurement.

10. The device according to claim 9 wherein said summing means includes digital scaling means for scaling the value of each signal indication a predetermined amount whereby a desired scaling may be obtained for the values of the incremental rotational movements.

11. The device according to claim 10 wherein said summing means includes, in addition, means for selectively establishing the scaling value of said digital scaling means whereby the scaling applied to said signal indicating means may be varied in accordance with the values of the incremental additional movements.

* * * * *